(12) United States Patent
Butzen

(10) Patent No.: US 12,381,481 B2
(45) Date of Patent: Aug. 5, 2025

(54) SWITCHED CAPACITOR VOLTAGE CONVERTER CIRCUIT WITH A HIERARCHICAL SWITCH NETWORK

(71) Applicant: Intel Corporation, Santa Clara, CA (US)

(72) Inventor: Nicolas Butzen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 17/484,961

(22) Filed: Sep. 24, 2021

(65) Prior Publication Data

US 2023/0110239 A1    Apr. 13, 2023

(51) Int. Cl.
*H02M 3/07* (2006.01)

(52) U.S. Cl.
CPC ............ *H02M 3/07* (2013.01); *H02M 3/072* (2021.05); *H02M 3/077* (2021.05)

(58) Field of Classification Search
None
See application file for complete search history.

(56) References Cited

U.S. PATENT DOCUMENTS

| | | | |
|---|---|---|---|
| 5,469,109 A | 11/1995 | Paivinen | |
| 7,554,537 B2 * | 6/2009 | Kamijo | H02M 3/07 345/211 |
| 8,144,143 B2 * | 3/2012 | Huang | H02M 3/07 345/87 |
| 8,754,672 B2 * | 6/2014 | Dennard | H03K 3/00 327/333 |
| 9,293,986 B2 * | 3/2016 | Thandri | H03F 1/025 |
| 9,405,688 B2 | 8/2016 | Nagarajan et al. | |
| 9,716,429 B2 * | 7/2017 | Liao | H02M 3/07 |

(Continued)

FOREIGN PATENT DOCUMENTS

| | | |
|---|---|---|
| JP | 2010259155 | 11/2010 |
| KR | 20210043337 | 4/2021 |

OTHER PUBLICATIONS

International Search Report and Written Opinion from PCT/US2022/034506 notified Oct. 14, 2022, 9 pgs.

(Continued)

*Primary Examiner* — Thomas J. Hiltunen
(74) *Attorney, Agent, or Firm* — NICHOLSON DE VOS WEBSTER & ELLIOTT LLP

(57) ABSTRACT

Techniques and mechanisms for generating an output voltage with a switched capacitor voltage converter (SCVR). In an embodiment, the SCVR comprises converter cores which are coupled in parallel via multiple buses including a first bus, which is to receive an input voltage, and a second bus with which the SCVR is to provide the output voltage based on the input voltage. A first converter core comprises a capacitor and a first hierarchical switch network (HSN) which is coupled between the capacitor and the multiple buses. The first HSN switchedly provides any of multiple conductive paths each between the capacitor and a different respective one of the multiple buses. Two or more of the conductive paths are each provided with at least one same switch circuit of the first HSN. In another embodiment, the first converter core comprises two HSNs which each have a respective branching tree topology.

20 Claims, 9 Drawing Sheets

(56) References Cited

U.S. PATENT DOCUMENTS

| | | | |
|---|---|---|---|
| 10,181,788 B2* | 1/2019 | Jung | H02M 3/07 |
| 10,707,753 B2* | 7/2020 | Koski | G06F 1/266 |
| 11,018,579 B2* | 5/2021 | Jung | G06F 1/08 |
| 11,177,733 B2 | 11/2021 | Park et al. | |
| 12,081,945 B2* | 9/2024 | Christensen | H04R 25/603 |
| 2005/0007185 A1* | 1/2005 | Kamijo | H02M 3/07 |
| | | | 327/536 |
| 2011/0101938 A1* | 5/2011 | Ma | H02M 3/07 |
| | | | 323/282 |
| 2012/0200163 A1* | 8/2012 | Ito | H02J 7/0024 |
| | | | 307/77 |
| 2017/0093270 A1 | 3/2017 | Matthew et al. | |
| 2023/0198384 A1* | 6/2023 | Butzen | H02M 3/07 |
| | | | 323/271 |

OTHER PUBLICATIONS

Butzen, Nicolas, et al., "A 94.6%-Efficiency Fully Integrated Switched-Capacitor DC-DC Converter in Baseline 40nm CMOS Using Scalable Parasitic Charge Redistribution", IEEE International Solid-State Circuits Conference, 59, pp. 220-221.

Butzen, Nicolas, et al., "A Single-Topology Continuously-Scalable-Conversion-Ratio Fully Integrated Switched-Capacitor DC-DC Converter with 0-to-2.22V Output and 93% Peak-Efficiency", 2018 Symposium on VLSI Circuits Digest of Technical Papers, 2 pgs.

Butzen, Nicolas, et al., "Design of Single-Topology Continuously Scalable-Conversion-Ratio Switched-Capacitor DC-DC Converters", IEEE Journal of Solid-State Circuits, vol. 54, No. 4, Apr. 2019, 9 pgs.

Butzen, Nicolas, et al., "Fully Integrated Advanced Multiphasing Switched-Capacitor DC-DC Converters", Arenberg Doctoral School, Faculty of Engineering Science, Oct. 2018, 218 pgs.

De Vos, Julien, "Switched Capacitor DC/DC Converters in Nanometer CMOS Technologies for Micro-Power Energy Management", Ecole Polytechnique de Louvain ICTEAM Institute, Dec. 2013, 174 pgs.

Van Breussegem, Tom, et al., "A Fully Integrated Gearbox Capacitive DC/DC-converter in 90nm CMOS: Optimization, Control and Measurements", Accessed Sep. 24, 2021, 5 pgs.

* cited by examiner

SWITCHED CAPACITOR VOLTAGE CONVERTER CIRCUIT WITH A HIERARCHICAL SWITCH NETWORK

BACKGROUND

1. Technical Field

This disclosure generally relates to voltage converter circuitry and more particularly, but not exclusively, to voltage converters which include a hierarchical arrangement of switch circuits.

2. Background Art

Many switched capacitor voltage regulator (SCVR) designs provide space and cost efficiencies due to their primary reliance on using only circuitry capacitors and switches. However, these designs are often limited to providing a relatively small range of conversion ratios around an ideal voltage conversion ratio (iVCR). These limitations are detrimental to the adaptation of SCVRs for use with dynamic voltage and frequency scaling and/or other technologies that need to accommodate large voltage variations.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
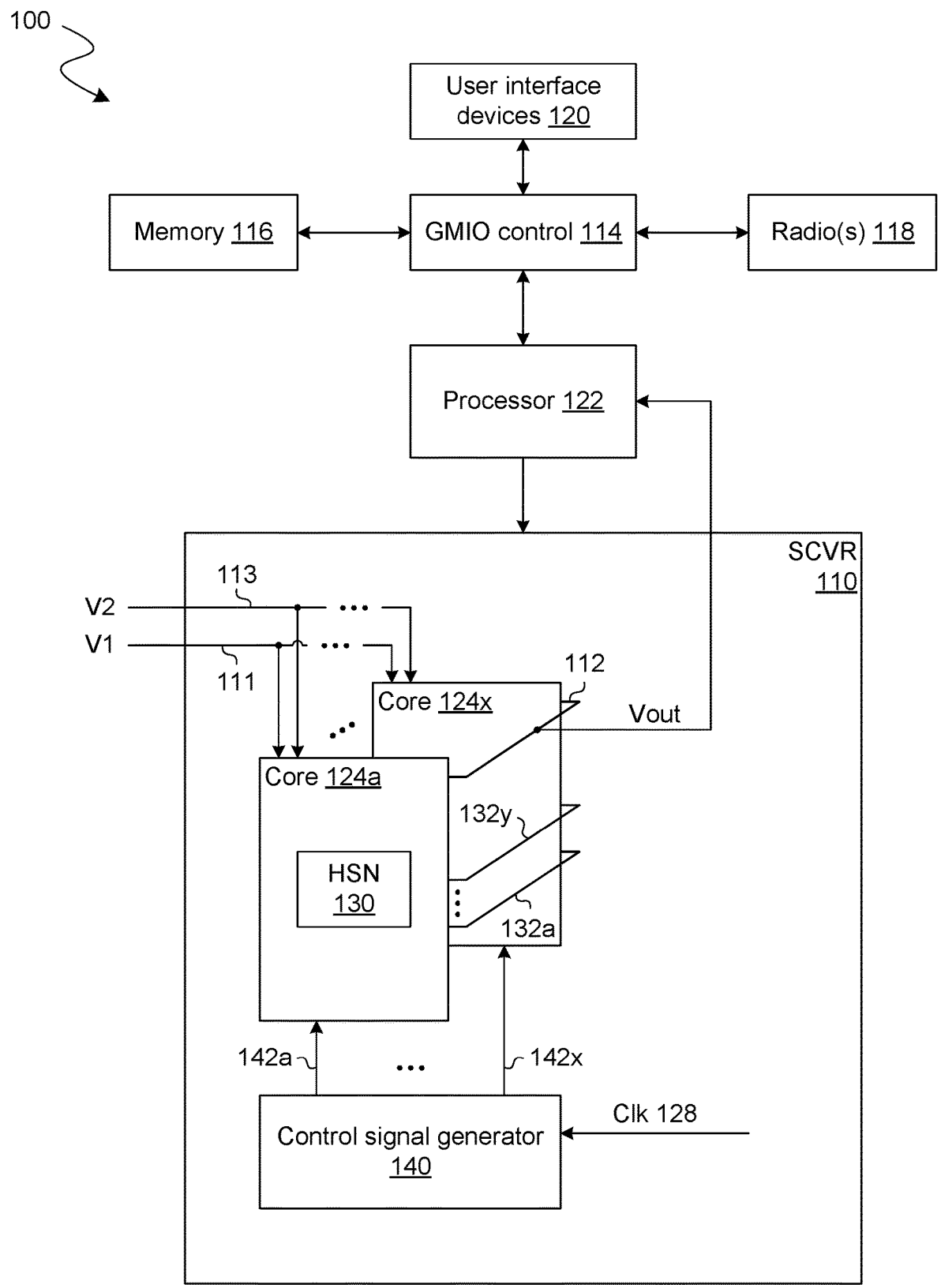
FIG. 1 shows a functional block diagram illustrating features of a system to provide a regulated voltage according to an embodiment.

Embodiments discussed herein variously provide techniques and mechanisms for providing an output voltage using a hierarchical switch network of a switched capacitor voltage regulator. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices providing a voltage regulator and/or logic to control operation of such a voltage regulator.

Some embodiments variously provide structures of, and/or operations with, a switched-capacitor (SC) voltage converter which comprises multiple circuits-variously referred to herein as "converter cores," or simply "cores"—that are coupled in parallel with each other via multiple buses. In various embodiments, the multiple buses comprise a first bus, which is to receive an input voltage, and a second bus which is to provide an output voltage generated by the SC voltage converter based on said input voltage. In one such embodiment, the multiple buses further comprise a first one or more buses which are each to function as a respective charge redistribution bus (CRB). In this context, "charge redistribution bus" refers herein to a bus which is to conduct charges between two cores—e.g., wherein the bus is other than any by which an SC voltage converter is to receive a particular input voltage, or provide a particular output voltage (such as one of a supply voltage, a ground potential, or the like).

A given converter core according to some embodiments comprises a capacitor, and a first switch network which is coupled between the capacitor and various ones of the multiple buses. For example, such a switch network comprises switch circuits which are configured to facilitate the selective provisioning of one or more conductive paths each between the capacitor and a different respective bus of the multiple buses. In some embodiments, the core further comprises a second switch network which is also coupled to the capacitor—e.g., wherein the first switch network and the second switch network are coupled to the capacitor via different respective terminals thereof.

In various embodiments, to facilitate efficient and/or reliable generation of an output voltage with a SC converter circuit, at least one switch network of a given converter core is what is referred to herein as a "hierarchical switch network." A hierarchical switch network comprises multiple hierarchical levels (or "tiers") of respective switches—e.g., wherein a switch circuit in a first ("higher") hierarchical level is coupled to selectively provide a conductive path to each of multiple switch circuits in a second ("lower") level. In one such embodiment, a HSN has a branching tree topology including (for example) multiple switch circuits in a highest hierarchical level.

In providing one or more HSNs of a converter core, some embodiments reduce the cost, space, and/or control signaling requirements for SC converter circuitry—e.g., as compared to conventional voltage converter designs. For example, some existing SCVRs types—e.g., including various continuous capacitive voltage regulator (C2VR) designs-provide for the switched coupling of a converter core's capacitor to any of multiple buses. However, these designs variously include multiple branches which are each coupled, independent of each other, between the capacitor and a corresponding bus. To enable a wide range for an output voltage (Vout)—for example, given an input voltage (Vin) of 2V—each such branch includes a respective two or more transistors which are coupled in series only with each other (e.g., and not in series with any transistor of a different branch).

Some embodiments are based on a realization by the inventor that one or more efficiencies are to be variously gained using a HSN which (for example) provides an alternative to the functionality of multiple switches of a conventional SC converter circuits—e.g., multiple switches which would otherwise be in different respective branches. More particularly, various embodiments effectively substitute such multiple switches with a single switch circuit which is to be in a relatively high hierarchical level of a HSN—e.g., where the single switch circuit is coupled (for example, in a branching tree topology) to multiple other switch circuits each in a relatively low hierarchical level of that HSN.

FIG. 1 shows features of a system 100 to provide a regulated voltage according to an embodiment. System 100 illustrates one example of an embodiment wherein voltage regulation is provided with multiple cores of a switched capacitor converter circuit, wherein one such core comprises a hierarchical switch network.

As shown in FIG. 1, system 100 comprises one or more processors 122, a graphics/memory/input/output (GMIO) control 114, a memory 116, a wireless interface/radio 118, and user interface devices 120. For example, system 100 comprises some or all of a computing platform such as that of a test system, design/debug tool, laptop, personal digital assistant (PDA), wireless smart phone, media player, imaging device, or any other suitable apparatus. One or more components of such a platform are to receive power from voltage regulator (VR) circuitry, such as that of the illustrative switched-capacitor VR (or "SCVR") 110 shown.

By way of illustration and not limitation, processor 122 is coupled to receive a voltage Vout which is generated by the SCVR 110 of system 100. However, the particular one or more components of system 100 which are to receive power from SCVR 110 are merely illustrative, and in other embodiments, SCVR 110 provides power to any of various additional or alternative components. Some embodiments are provided entirely with circuitry of SCVR 110, and/or entirely with logic (comprising hardware, firmware and/or executing software) which is configured to control operation of said circuitry.

In the example embodiment shown, processor 122 is coupled to memory 116, radios 118, and user interface devices 120 through GMIO control 114. GMIO control 114 includes one or more blocks (e.g., chips or units within an integrated circuit) to perform various interface control functions (e.g., memory control, graphics control, I/O interface control, and the like). These circuits are implemented, for example, on one or more separate chips, and/or are partially or wholly implemented within a chip comprising processor 122. In various embodiments, SCVR 110 is alternatively implemented within processor 122 or within any of various other such components of system 100.

In some embodiments, memory 116 comprises one or more memory blocks to provide additional RAM to the processor 122. Memory 116 is implemented, for example, with any suitable memory including but not limited to dynamic RAM (DRAM), static RAM (SRAM), flash memory, or the like. In an embodiment, radios 118 wirelessly couple processor 122 to a wireless network (not shown). In some embodiments, user interface devices 120 include one or more devices such as a display, keypad, mouse, etc. to allow a user to interact with and perceive information from the system 100.

The illustrated SCVR 110 comprises multiple circuits-referred to herein as "converter cores" (or, for brevity, simply "cores")—which are coupled in parallel with each other, and which are to function as a switched-capacitor (SC) DC-DC converter. In one such embodiment, a DC input voltage signal/level/potential is received, for example, from a battery (not shown) or other rail source that is included in—or alternatively, is to couple to—system 100. Based on the received input voltage, the converter cores generate an output voltage, which processor core 122 (and/or other circuitry of system 100) uses during operation thereof—e.g., to perform various computing tasks.

By way of illustration and not limitation, SCVR 110 comprises multiple converter cores (such as the illustrative cores 124a, . . . , 124x shown) which are variously coupled to each other via each of multiple buses. The multiple buses comprise a bus 111 which is to receive an input voltage V1, a bus 112 which provides an output voltage Vout, and one or more other buses such as the illustrative charge redistribution buses CRBs 132a, . . . , 132y shown. For example, voltage V1 comprises one of a common collector voltage Vcc, or a source supply voltage Vss.

Cores 124a, . . . , 124x operate in combination with each other, and with the multiple buses, as a voltage converter which generates voltage Vout based on voltage V1. In one such embodiment, the generation of voltage Vout comprises two or more converter cores—e.g., including cores 124a, 124x—distributing charges via some or all of bus 111, bus 112, and CRBs 132a, . . . , 132y. Such charge redistribution is facilitated at least in part with switch circuits of a given converter core—e.g., wherein said switch circuits are arranged in a hierarchical switch network.

By way of illustration and not limitation, a given one of cores 124a, . . . , 124x—in this example embodiment, core 124a—comprises at least one capacitor (not shown), and a hierarchical switch network HSN 130 which is coupled between a given terminal of the capacitor, and some or all of the multiple buses. In one such embodiment, switch circuits of HSN 130 are arranged in a branching tree topology comprising multiple levels (or "tiers") including a first level—which is the level most closely coupled to the at least one capacitor (in some embodiments, an arrangement of multiple capacitors)—and one or more other levels which are variously coupled between the first level and the multiple buses. Branches of HSN 130 (the branches each comprising a respective two or more switches) variously extend each to facilitate the selective provisioning of a conductive path between the capacitor and a respective one of the multiple buses. In some embodiments, a given switch circuit of HSN 130 is in each of two or more such branches—e.g., wherein activation of said switch circuit is a condition of providing a conductive path to any one of two or more buses.

In various embodiments, SCVR 110 includes—or alternatively, accommodates coupling to—circuitry (such as that of the illustrative control signal generator 140 shown) which generates one or more control signals to operate switch circuits of HSN 130 and/or one or more of any other HSNs of cores 124a, . . . , 124x. For example, control signal generator 140 provides to cores 124a, . . . , 124x respective control signals 142a, . . . , 142x which variously operate switch circuitry of the voltage converter. In one such embodiment, HSN 130 is configured to receive a first one or more control signals (e.g., including the illustrative control signal 142a shown), and based thereon, to selectively provide any of various conductive paths each between a first terminal of the capacitor and a different respective bus of the multiple buses. In some embodiments, some or all of control signals 142a, . . . , 142x are generated based on a clock signal Clk 128 which determines a sequential transitioning of a given one of cores 124a, . . . , 124x between various modes (or "phases") each comprising a respective configuration state of switch circuitry.

The multiple buses further comprise an additional bus 113 by which cores 124a, . . . , 124x, are to receive another input voltage V2 (e.g., wherein voltages V1, V2 comprise a common collector voltage Vcc and a source supply voltage Vss). In one such embodiment, voltage Vout is generated further based on voltage V2—e.g., wherein core 124a further comprises a second HSN (not shown), and the generating of Vout comprises cores 124a, . . . , 124x further distributing charges with the second HSN. For example, HSN 130 is coupled to the capacitor of core 124a via a first terminal thereof, wherein a second HSN of core 124a is coupled to that same capacitor via a second terminal thereof. Based on a first one or more control signals from control signal generator 140, HSN 130 selectively couples the first terminal to any of a first plurality of buses of the multiple buses. Similarly, based on a second one or more control signals from control signal generator 140, the second HSN selectively couples the second terminal to any of a second plurality of buses of the multiple buses. In one such embodiment, the first plurality of buses comprises bus 111, bus 112, and one or more of CRBs 132a, . . . , 132y—e.g., wherein the second plurality of buses comprises bus 113, bus 112, and a different one or more of CRBs 132a, . . . , 132y.

In various embodiments, successively coupling the capacitor of core 124a to various ones of the multiple buses takes place in combination one or more others of cores 124a, . . . , 124x each similarly coupling respective capacitors to said buses at various times. This enables charges to be variously (re) distributed between capacitors of cores 124a, . . . , 124x to facilitate the generation of voltage Vout based on voltages V1, V2. In one such embodiment, two or more of cores 124a, . . . , 124x each include a respective one or more HSNs having features such as those described herein.

Figure 2:
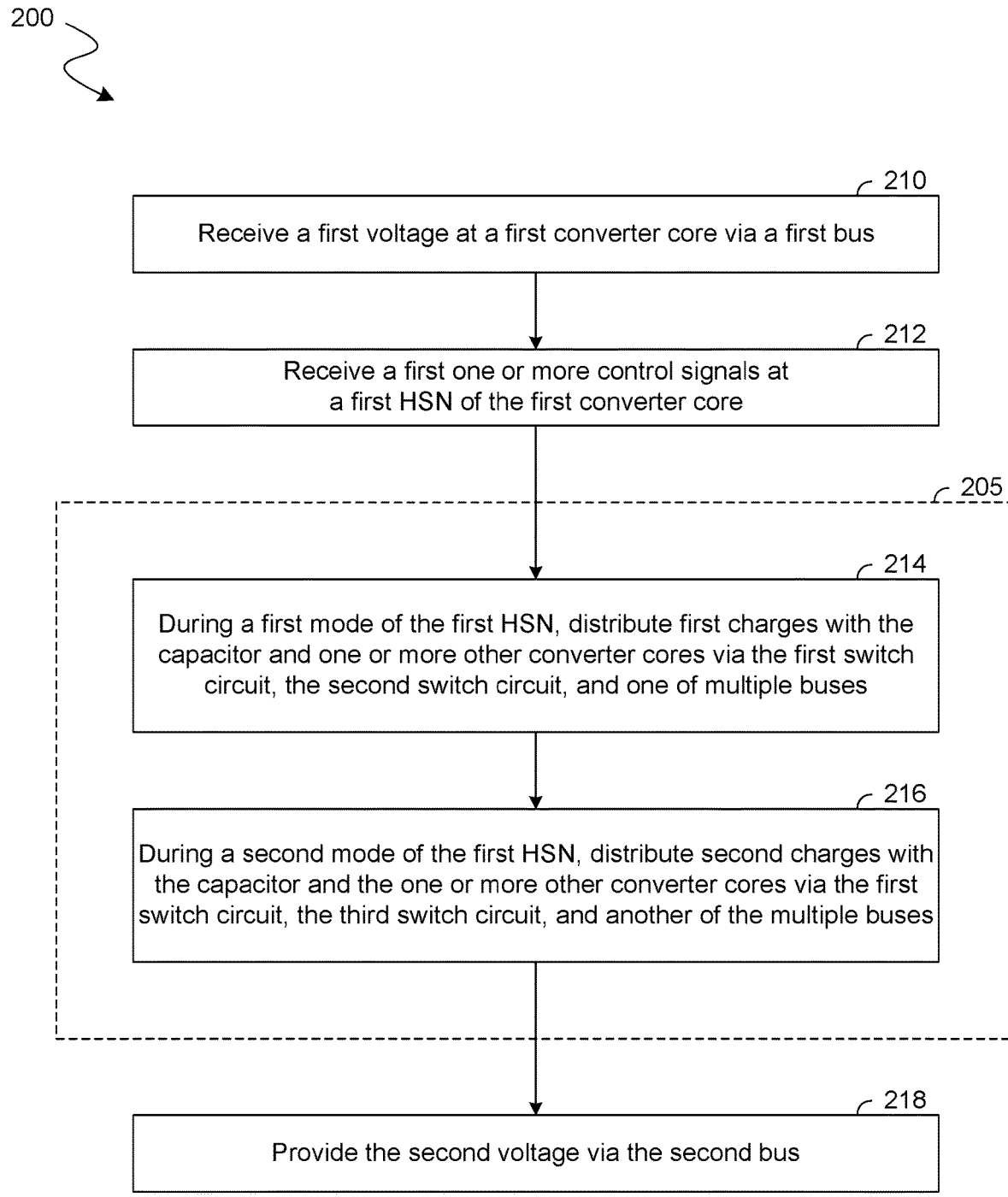
FIG. 2 shows a flow diagram illustrating features of a method to operate a switched-capacitor voltage regulator according to an embodiment.

FIG. 2 shows features of a method 200 to operate a switched-capacitor voltage regulator according to an embodiment. Method 200 illustrates one example of an embodiment wherein voltage regulation is provided with operation of a HSN of a SCVR core. Operations such as those of method 200 are performed, for example, with some or all of system 100.

As shown in FIG. 2, method 200 comprises (at 210) receiving a first voltage at a first converter core via a first bus. For example, the receiving at 210 comprises core 124a receiving voltage V1 via bus 111. In an embodiment, the first converter core comprises a capacitor, and a first hierarchical switch network (HSN) which is coupled to the capacitor. By way of illustration and not limitation, a first hierarchical level of the first HSN comprises a first plurality of switch circuits including a first switch circuit, wherein a second hierarchical level of the first HSN comprises a second plurality of switch circuits comprising a second switch circuit and a third switch circuit. Each switch circuit of the first plurality of switch circuits is coupled (for example) between the capacitor and a corresponding two or more switch circuits of the second plurality of switch circuits—e.g., wherein the first switch circuit is coupled to selectively provide a conductive path between the capacitor and each of the second switch circuit and the third switch circuit.

In some embodiments, the first converter core is further coupled to a second bus—with which an output voltage is to be provided based on the first voltage—and to one or more third buses (which, for example, are to function each as a respective CRB). In one such embodiment, for each switch circuit of the second plurality of switch circuits, the switch circuit is coupled between the first level and a different respective one of multiple buses comprising the first bus, the second bus, and the one or more third buses.

Method 200 further comprises (at 212) receiving a first one or more control signals at the first HSN—e.g., including HSN 130 receiving the one or more control signals represented by control signal 142a. In an embodiment, method 200 further comprises operations 205 for generating a second voltage (e.g., generating voltage Vout with core 124a), based on the first voltage, by operating the first HSN with the first one or more control signals. For example, operations 205 comprise (at 214) distributing first charges, during a first mode of the first HSN, with the capacitor of the first converter core and one or more other converter cores. In an embodiment, the first charges are distributed at 214 via the first switch circuit, the second switch circuit, and one of the multiple buses which comprise the first bus, the second bus and the one or more third buses—e.g., wherein the first mode provides a conductive path between the In one such embodiment, operations 205 further comprise (at 216) distributing second charges, during a second mode of the first HSN, with the capacitor and the one or more other converter cores via the first switch circuit, the third switch circuit, and another of the multiple buses. For example, the first switch circuit, second switch circuit, and third switch circuit are coupled to each other as part of a branching tree topology of the first HSN.

In an embodiment, method 200 further comprises (at 218) providing the second voltage via the second bus—e.g., including voltage Vout being provided at bus 112 with core 124a. In some embodiments, the first core further comprises a second HSN which is similarly coupled between the capacitor and various ones of the multiple buses—e.g., wherein the second voltage is further generated with the second HSN. In one such embodiment, the first HSN and the second HSN are coupled to the capacitor via (respectively) a first terminal and a second terminal thereof, wherein the multiple buses further comprise a fourth bus—e.g., bus 113—and one or more fifth buses which, for example, are to function each as a respective CRB.

By way of illustration and not limitation, method 200 further comprises other operations (not shown) including, for example, receiving a third voltage at the first converter via the fourth bus—e.g., including core 124a receiving voltage V2 via bus 113. In one such embodiment, operations 205 further comprise operating the second HSN with a second one or more control signals (provided, for example, by control signal generator 140).

For example, based on the second one or more control signals, third charges are distributed, during a third mode of the second HSN, with the capacitor and the one or more other converter cores. The third charges are distributed, in an embodiment, via a fourth and fifth switch circuits in different respective hierarchical levels of the second HSN. In some embodiments, the third charges are distributed further via the fourth bus, or one of the one or more fifth buses. Furthermore, based on the second one or more control signals, fourth charges are also distributed, during a fourth mode of the second HSN, via the fourth switch circuit and a sixth switch circuit of the second HSN. In one such embodiment, the fourth charges are further distributed via another bus of the fourth bus and the one or more fifth buses.

In an illustrative scenario according to one embodiment, method 200 successively provides different switch modes of the first converter core to facilitate charge distribution with another converter core—e.g., wherein the other converter core performs a corresponding method to similarly provide another sequence of switch states. For example, based on the first one or more control signals, the first converter core provides a first sequence of a first plurality of modes of the first HSN—e.g., wherein the first plurality of modes each couple the second bus, via the capacitor, to a different respective bus of a plurality of buses comprising the first bus and the one or more third buses.

In one such embodiment, based on the second one or more control signals, the first converter core additionally or alternatively provides a second sequence of a second plurality of modes of the second HSN—e.g., wherein the second plurality of modes each couple the second bus, via the capacitor, to a different respective bus of a plurality of buses comprising the fourth bus and the one or more fifth buses.

Additionally or alternatively, in some embodiments, the first converter core, based on the first one or more control signals and the second one or more control signals, provides a third sequence of a third plurality of modes of the first HSN and the second HSN. In one such embodiment, the third plurality of modes each to couple the fourth bus, via the capacitor, to a different respective bus of the one or more third buses.

In various embodiments, based on the first one or more control signals and the second one or more control signals, the first converter core provides a fourth sequence of a fourth plurality of modes of the first HSN and the second HSN, the fourth plurality of modes. For example, the fourth plurality of modes each to couple the first bus, via the capacitor, to a different respective bus of the one or more fifth buses. In variously providing some or all such switch mode sequences with the first converter core—e.g., in combination with similar switch mode sequences of one or more other converter cores-some embodiments variously facilitate a distribution of charge to enable reliable and/or efficient generation of the second voltage.

Figure 3A:
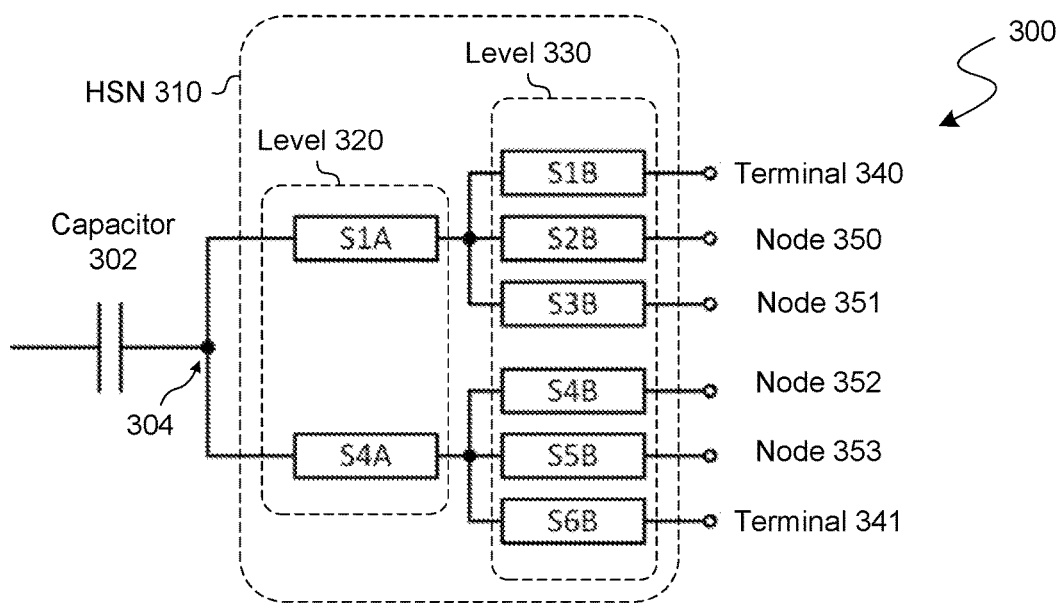
FIG. 3A shows a functional block diagram illustrating features of a voltage regulator core to provide switched coupling with a capacitor according to an embodiment.

FIG. 3A shows features of a SC converter core 300 to provide switched coupling with a capacitor according to an embodiment. SC converter core 300 illustrates one example of an embodiment wherein selective electrical coupling, between a capacitor and various terminals and/or charge redistribution buses, is provided with a HSN. In various embodiments, SC converter core 300 provides functionality such as that of core 124a—e.g., wherein one or more operations of method 200 are performed with SC converter core 300.

As shown in FIG. 3A, SC converter core 300 comprises a capacitor 302 and a HSN 310 which is coupled to capacitor 302 via a node 304 at a terminal of capacitor 302. In an embodiment, HSN 310 is coupled between node 304 and a plurality of buses by which SC converter core 300 is to distribute charges with one or more other cores of a SCVR. For example, SC converter core 300 is coupled via respective terminals 340, 341 to buses 111, 112 (or other such buses to receive an input voltage, and to provide an output voltage). Furthermore, SC converter core 300 is variously coupled to charge distribution buses each via a respective one of nodes 350-353.

In the example embodiment shown, HSN 310 has a branching tree network topology comprising multiple hierarchical levels (or "tiers")—e.g., including the illustrative levels 320, 330 shown—of respective switch circuits. For example, level 320 of HSN 310 comprises a first plurality of switch circuits, such as switches S1A, S4A. Level 330 of HSN 310 comprises a second plurality of switch circuits including, for example, switches S1B, S2B, S3B, S4B, S5B, and S6B. In one such embodiment, switch S1A is coupled between node 304 and each of switches S1B, S2B, and S3B—e.g., wherein switch S4A is coupled between node 304 and each of switches S4B, S5B, and S6B. However, the number of the multiple levels in HSN 310, the numbers of switches in any one such level, the number of the multiple buses, and the various coupling of switches in different levels, is merely illustrative and not limiting on some embodiments.

Figure 3B:
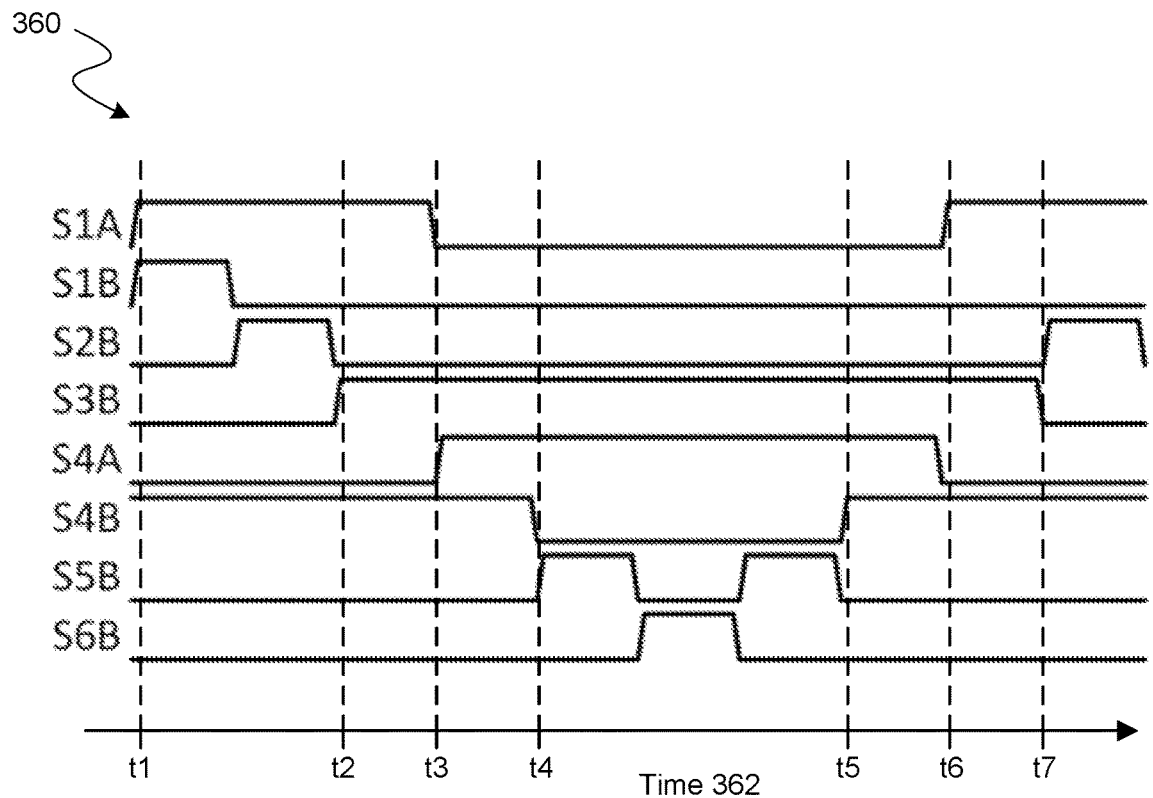
FIG. 3B shows a timing diagram illustrating features of control signals to operate a switched-capacitor voltage regulator according to an embodiment.

FIG. 3B shows features of a timing diagram 360 illustrating control signals to operate a switched-capacitor voltage regulator according to an embodiment. For example, control signals such as those shown in timing diagram 360 facilitate functionality of core 124a—e.g., wherein one or more operations of method 200 are based on said control signals.

As shown in FIG. 3B, timing diagram 360 shows characteristics, over a period of time 362, for respective switch control signal which variously operate switches S1A, S1B, S2A, S3B, S4A, S4B, S5B, S6B of HSN 300. A high level of a given switch control signal indicates that the corresponding switch circuit is in an active (e.g., "closed circuit") state that provides a conductive path. By contrast, a low level of the switch control signal indicates that the corresponding switch circuit is in an inactive (e.g., "open circuit") state that prevents the provisioning of said conductive path In an illustrative scenario according to one embodiment, switch S1A is transitioned to an active state at a time t1 and remains in said active state until a time t3. While switch S1A is in the active state, each of switches S1B, S2B, and S3B is successively activated between times t1, t3, thereby successively providing conductive paths to electrically couple capacitor 302 to terminal 340, then to node 350, and then to node 351.

At time t3, switch S4A is transitioned to an active state, and remains in said active state until a time t6. While switch S4A is in the active state, various activations of switches S4B, S5B, and S6B are performed to sequentially provide conductive paths each to electrically couple capacitor 302 to a respective one of node 352, node 353, or terminal 340. At time t6, switch S4A is deactivated, and switch S1A activated, to commence another instance of the sequence of switch states which began at time t1.

In one such embodiment, switch operations such as those illustrated in timing diagram 360 are performed while corresponding switch operations are performed at one or more other converter cores which are similarly couple to terminals 340, 341 and to nodes 350 through 353. As described herein, such switch operations facilitate a distribution of charges between various cores of a SCVR.

As shown in FIG. 3A, a given switch circuit of level 320 is shared among several lower level switch circuits—e.g., wherein switch S1A, for example, is coupled to selectively provide a conductive path to each of lower level switches S1B, S2B, S3B. When these lower level switches are activated sequentially in a given clock cycle (equal to the period of time t6–t1), some embodiments leave a last switch in the sequence—in this example embodiment, switch S3B—in an active state even after S1A is turned off at time t3. This facilitates a more consistent biasing of the node between switch S1A and each of switches S1B, S2B, S3B at an appropriate level to mitigate stressing of switch S1A. Such biasing mitigates noise at the node, for example. Moreover, keeping switch S3B on after time t3 means that only one activation of switch S3B is needed per full clock cycle. This is in addition to the reduced per-cycle switching that some embodiments provided with a smaller total number of switch circuits (as compared to that of existing SCVR designs). Such embodiments provide a relatively large number and/or percentage of switches that are activated only once per cycle, thus reducing switching losses.

Figure 4:
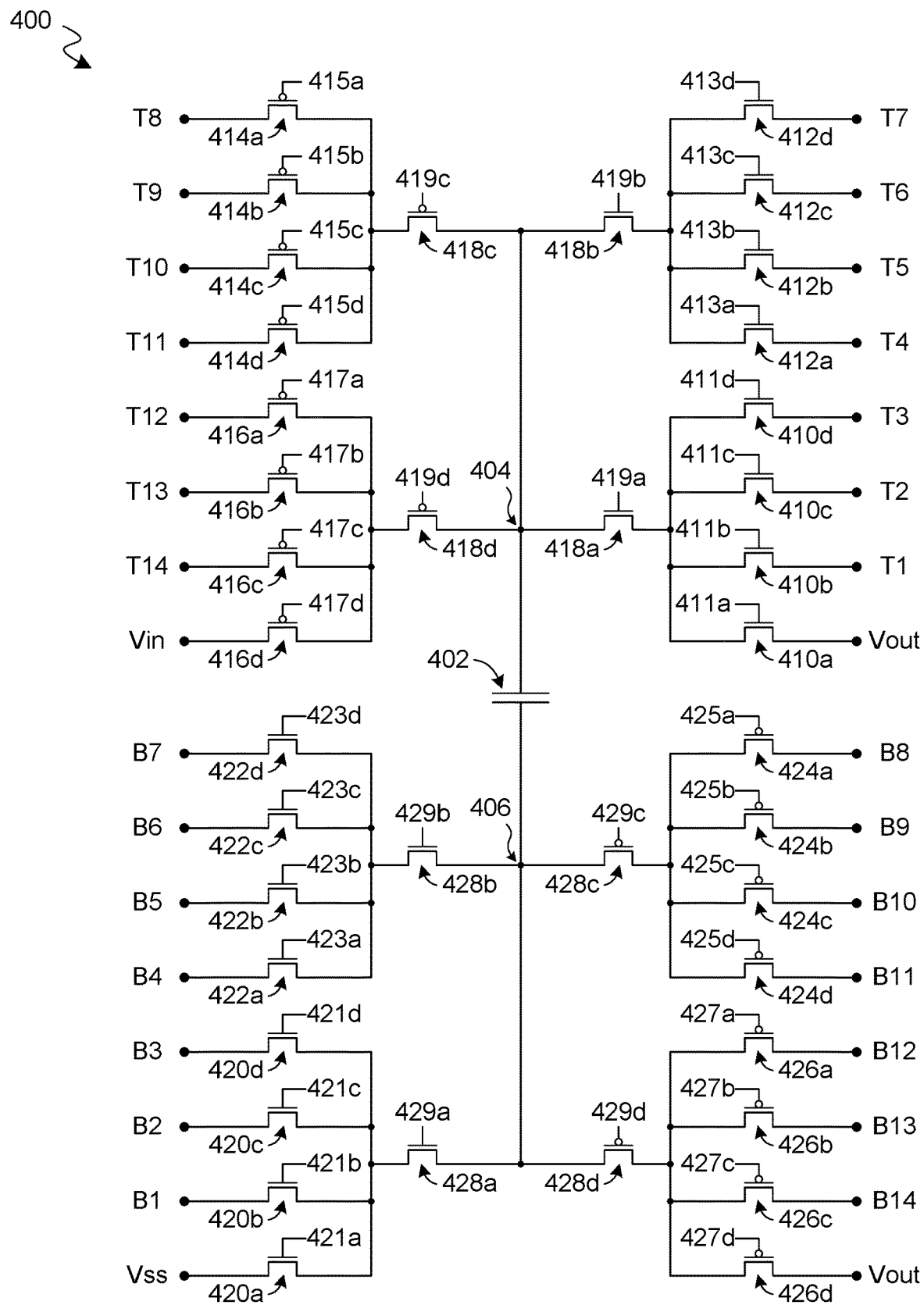
FIG. 4 shows a circuit diagram illustrating features of a switched-capacitor voltage regulator comprising cores which are coupled via charge redistribution buses according to an embodiment.

FIG. 4 shows features of a SC converter core 400 which is to be coupled to one or more other such cores via charge redistribution buses according to an embodiment. SC converter core 400 illustrates one example of an embodiment wherein two or more hierarchical switch networks (HSNs) are provided by a core to facilitate coupling with another one or more cores. In various embodiments, SC converter core 400 provides functionality such as that of core 124a—e.g., wherein one or more operations of method 200 are performed with SC converter core 400.

As shown in FIG. 4, SC converter core 400 comprises a first HSN, a second HSN, and a capacitor 402 coupled therebetween. Switch circuits of the first HSN are coupled in a first branching tree topology which facilitates selective coupling of capacitor 402 to any of a first plurality of buses. For example, the first plurality of buses comprises a first bus which receives a voltage Vin, a second bus to provide an output voltage Vout based on voltage Vin, and N charge redistribution buses (where N is a positive integer).

Similarly, switch circuits of the second HSN are coupled in a second branching tree topology which facilitates selective coupling of capacitor 402 to any of a second plurality of buses. For example, the second plurality of buses comprises the second bus (which provides voltage Vout), a third bus which is to receive another input voltage Vss, and another M charge redistribution buses (where M is a positive integer). In the example embodiment shown, N=M=14—e.g., wherein the first plurality of buses comprises the illustrative CRBs T1 through T14, and the second plurality of buses comprises the illustrative CRBs B1 through B14. In one such embodiment, a SCVR which includes core 400 has a total of (1+2N+2M)=57 converter cores. Although some embodiments are not limited in this regard, individual switch circuits of SC converter core 400 are implemented each with a different respective transistor—e.g., including thin-oxide transistors to enable a wide Vout range (with a Vin of 2V, for example).

By way of illustration and not limitation, the first HSN comprises transistors 410a-d, 412a-d, 414a-d, 416a-d, and 418a-d. A first level of the first HSN comprises transistors 418a-d, which are each coupled to a node 404 at a first (e.g., "top") terminal of capacitor 402. A second level of the first HSN comprises transistors 410a-d, 412a-d, 414a-d, and 416a-d, wherein the first level transistors 418a-d of the first HSN are each coupled between node 404 and a corresponding two or more transistors (in this example, four transistors) of the second level of the first HSN.

To facilitate a distribution of charge with SC converter core 400 and another core, transistors 418a-d are variously operated by respective control signals 419a-d to selectively provide one or more conductive paths each between node 404 and the second level of the first HSN. Furthermore, transistors 410a-d, 412a-d, 414a-d, and 416a-d are selectively operated by control signals 411a-d, 413a-d, 415a-d, and 417a-d (respectively) to selectively provide one or more conductive paths each between the first level of the first HSN and the first plurality of buses.

In one such embodiment, the second HSN of SC converter core 400 comprises transistors 420a-d, 422a-d, 424a-d, 426a-d, and 428a-d. A first level of the second HSN comprises transistors 428a-d, which are each coupled to a node 406 at a second (e.g., "bottom") terminal of capacitor 402. A second level of the second HSN comprises transistors 420a-d, 422a-d, 424a-d, and 426a-d, wherein the first level transistors 428a-d of the second HSN are each coupled between node 406 and a corresponding two or more transistors (in this example, four transistors) of the second level of the second HSN.

To further facilitate the charge distribution with SC converter core 400, transistors 428a-d are variously operated by respective control signals 429a-d to selectively provide one or more conductive paths each between node 406 and the second level of the second HSN. Furthermore, transistors 420a-d, 422a-d, 424a-d, and 426a-d are selectively operated by control signals 421a-d, 423a-d, 425a-d, and 427a-d (respectively) to selectively provide one or more conductive paths each between the first level of the second HSN and the second plurality of buses. In some embodiments, nodes 404, 406 are each further coupled to a different respective two bootstrap capacitors (not shown) to promote conductance over the wide range of voltages. For example, some or all such bootstrap capacitors are variously charged each when a respective CRB is switchedly coupled to the Vout bus.

Figure 5:
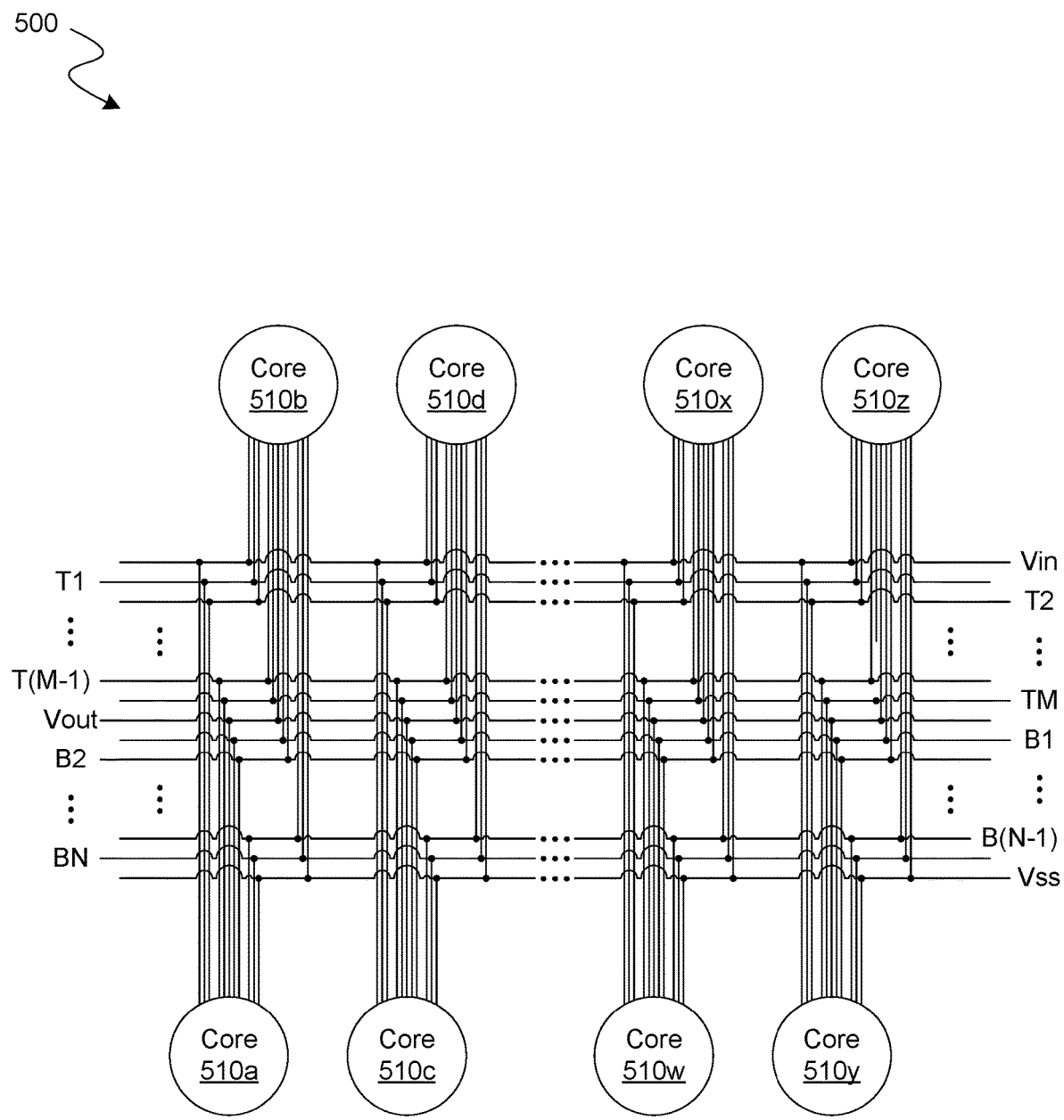
FIG. 5 shows a block diagram illustrating features of a switched-capacitor voltage regulator to redistribute charge between various cores according to an embodiment.

FIG. 5 shows features of a SC voltage converter 500 to redistribute charge between various cores according to an embodiment. In various embodiments, SC voltage converter 500 provides functionality such as that of SCVR 110—e.g., wherein one or more operations of method 200 are performed with SC voltage converter 500.

As shown in FIG. 5, SC voltage converter 500 comprises converter cores 510a, . . . , 510z which are coupled to variously distribute charges with each other via multiple buses. In various embodiments, cores 510a, . . . , 510z each correspond functionally to a respective one of cores 124a, . . . , 124x—e.g., wherein some or all of cores 510a, . . . , 510z each have features of one of cores 300, 400, for example. In one such embodiment, cores 510a, . . . , 510z each comprise a respective capacitor, and respective switch networks each to selectively provide conductive paths, at different times, between that respective capacitor and various ones of the multiple buses.

For example, a given one of cores 510a, . . . , 510z, comprises two switch networks, one of which is coupled between the respective capacitor and a first plurality of buses, and the other of which is coupled between the respective capacitor and a second plurality of buses. In the example embodiment shown, the first plurality of buses comprises a first bus which receives a voltage Vin, a second bus to provide an output voltage Vout based on voltage Vin, and M charge redistribution buses T1, . . . , TM (where M is a positive integer). By contrast, the second plurality of buses comprises the second bus (which provides voltage Vout), a third bus which is to receive another input voltage Vss, and N other charge redistribution buses B1, . . . , BN (where N is a positive integer). In one such embodiment, a total number X of the cores 510a, . . . , 510z of SC voltage converter 500 is equal to the sum (1+2N+2M). In various embodiments the switch networks of cores 510a, . . . , 510z include one or more hierarchical switch networks having (for example) features of HSN 130, HSN 310, or a HSN of SC converter core 400.

In various embodiments, SC voltage converter 500 further comprises, couples to, or otherwise accommodates operation with, control circuitry—such as that of control signal generator 140—which provides control signals (not shown) to operate the respective switch networks of cores 510*a*, . . . , 510*b*. In one such embodiment, the control signals comprise periodic signals (referred to herein as "non-overlapping clock signals") which have a same frequency, but non-overlapping phases.

Figure 6:
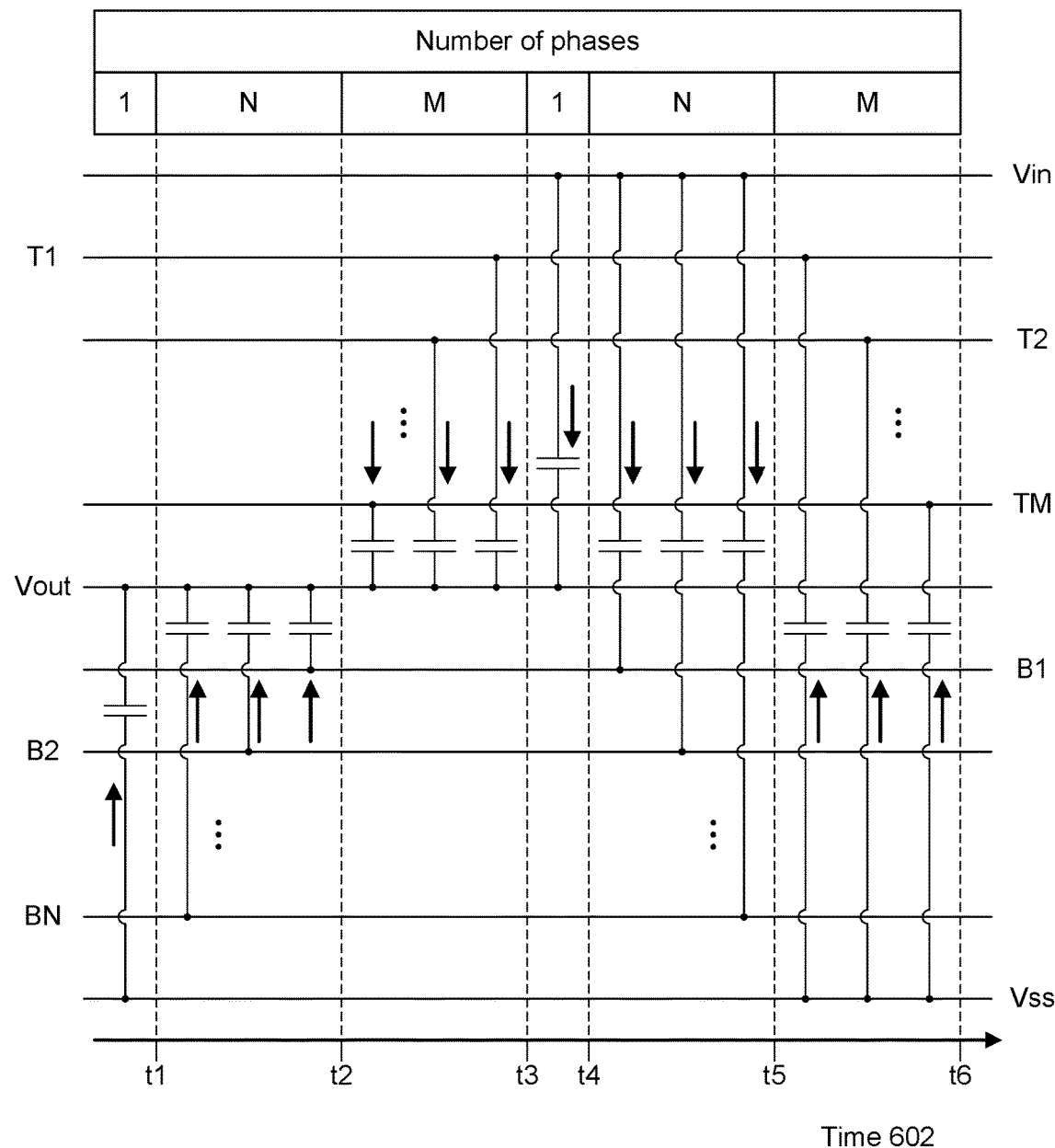
FIG. 6 shows a timing diagram illustrating features of operations by a switched-capacitor voltage regulator according to an embodiment.

FIG. 6 shows features of a timing diagram 600 illustrating operations by a switched-capacitor voltage regulator according to an embodiment. For example, operations such as those represented in timing diagram 600 are performed with one of cores 124*a* . . . 124*x*, core 300, core 400, or one of cores 510*a*, . . . , 510*z*—e.g., according to method 200.

As shown in FIG. 6, timing diagram 600 shows various conductive paths which are successively provided by a converter core over a period of time 602. The converter core comprises a first HSN, a second HSN, and a capacitor which is coupled between the first and second HSNs. For example, the capacitor, first HSN, and second HSN correspond functionally to capacitor 402, the HSN of core 400 which is coupled to capacitor 402 via node 406, and the other HSN of core 400 which is coupled to capacitor 402 via node 404. In one such embodiment, the first HSN is operated with first control signals which (for example) correspond functionally to switch control signals 421*a-d*, 423*a-d*, 425*a-d*, 427*a-d*, and 429*a-d*. By contrast, the second HSN is operated with second control signals which (for example) correspond functionally to switch control signals 411*a-d*, 413*a-d*, 415*a-d*, 417*a-d*, and 419*a-d*.

In the example embodiment represented with timing diagram 600, the converter core is to be coupled to multiple buses comprising a first "Vin" bus which is to receive a first input voltage, a second "Vss" bus which is to receive a second input voltage, and a third "Vout" bus with which the voltage converter is to provide an output voltage based on the first and second input voltages. The multiple buses further comprise M charge redistribution buses T1, . . . , TM and N additional charge redistribution buses B1, . . . , BN (where M and N are positive integers). In one such embodiment, a clock cycle—e.g., a single cycle of a reference clock signal—is divided into (2N+2M+1) phases to coordinate operation of the converter core with one or more other cores. For each such phase, a corresponding switch mode of the converter core is to be configured to switchedly couple the capacitor to a respective two of the multiple buses. Such switch modes are provided sequentially to facilitate a distribution of charges with the converter core and one or more other cores. In timing diagram 600, arrows represent various directions of charge distribution through the capacitor of the converter core.

In the example embodiment shown, a first plurality of switch modes of the first HSN are successively configured according to a first sequence based on the first control signals. The first plurality of switch modes comprises a first switch mode (during a phase ending at time t1) wherein the first HSN provides a conductive path, via the capacitor, between the Vss bus and the Vout bus. In an embodiment, the first plurality of switch modes further comprises N switch modes, each corresponding to a different respective bus of CRBs B1, . . . , BN. For each of the N switch modes (which are configured sequentially during the N phases between time t1 and time t2), the switch mode provides a respective conductive path, via the capacitor, between the Vout bus and the corresponding one of CRBs B1, . . . , BN.

In some embodiments, the sequence of switch modes represented in timing diagram 600 further comprises a second plurality of switch modes of the second HSN, which (for example) are successively configured according to a second sequence based on the second control signals. For example, the second plurality of switch modes comprises M switch modes which each correspond to a different respective bus of CRBs T1, . . . , TM. For each of the M switch modes (which are configured sequentially during the M phases between time t2 and time t3), the switch mode provides a respective conductive path, via the capacitor, between the Vout bus and the corresponding one of CRBs T1, . . . , TM. In the embodiment shown, the second plurality of switch modes further comprises another switch mode (during a phase between times t3, t4) wherein the second HSN provides a conductive path, via the capacitor, between the Vout bus and the Vin bus In one such embodiment, the sequence of switch modes represented in timing diagram 600 further comprises a third sequence of a third plurality of switch modes which are provided with both the first HSN and the second HSN—e.g., based on both the first control signals and the second control signals. For example, the third plurality of switch modes comprises another N switch modes (e.g., configured sequentially during the N phases between time t4 and time t5) which each correspond to a different respective bus of CRBs B1, . . . , BN. For each of the other N switch modes, the switch mode provides a respective conductive path, via the capacitor, between the Vin bus and the corresponding one of CRBs B1, . . . , BN.

In one such embodiment, the sequence of switch modes represented in timing diagram 600 further comprises a fourth sequence of a fourth plurality of switch modes of the first HSN and the second HSN. For example, the fourth plurality of switch modes are successively configured according to a fourth sequence based on the first and second control signals. In an embodiment, the fourth plurality of switch modes comprises another M switch modes which each correspond to a different respective bus of CRBs T1, . . . , TM. For each of the fourth plurality of switch modes, the switch mode provides a respective conductive path, via the capacitor, between the Vss bus and the corresponding one of CRBs T1, . . . , TM.

Figure 7:
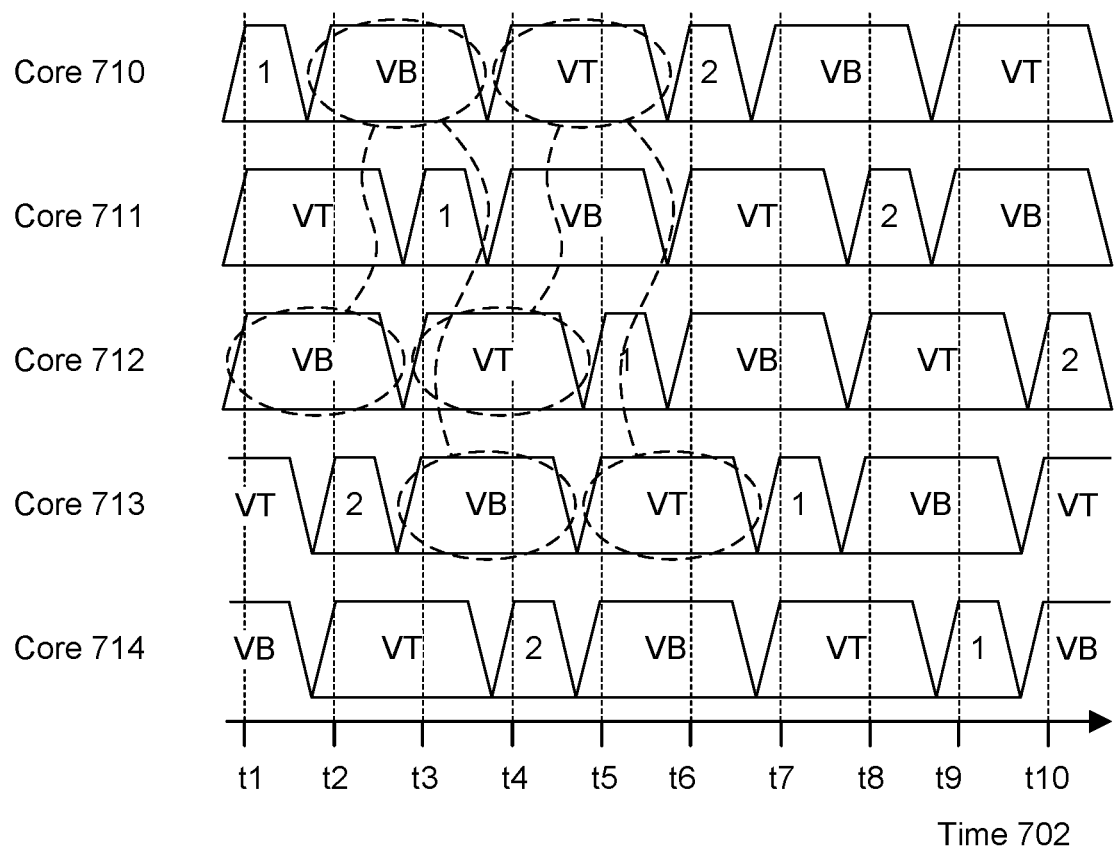
FIG. 7 shows a timing diagram illustrating features of operations by a switched-capacitor voltage regulator according to an embodiment.

FIG. 7 shows features of a timing diagram 700 illustrating operations by a switched-capacitor voltage regulator according to an embodiment. Operations such as those represented in timing diagram 700 are performed, for example, with circuitry of SCVR 110—e.g., where some or all such operations are according to method 200.

As shown in FIG. 7, timing diagram 700 illustrates conductive connections which are successively provided between various ones of multiple converter cores 710, . . . , 714 over a period of time 702. In some embodiments, cores 711, . . . , 714 provide functionality such as that of cores 124*a*, . . . , 124*x* (or cores 510*a*, . . . , 510*z*, for example)—e.g., wherein cores 711, . . . , 714 include features of core 300, or of core 400. For example, some or all of converter cores 710, . . . , 714 each comprise a respective first HSN, a respective second HSN, and a respective capacitor which is coupled between the first and second HSNs.

In the example embodiment shown, cores 710, . . . , 714 are coupled in parallel with each other via multiple buses comprising both a Vin bus and a Vss bus (which are to receive respective input voltages), as well as a Vout bus which is to provide an output voltage based on the respective input voltages. Furthermore, the multiple buses comprise a first one or more CRBs which are to be selectively coupled to a first ("bottom") terminal of a cores' capacitor. Further still, the multiple buses comprise a second one or more CRBs which are to be selectively coupled to a second ("top") terminal of that cores' capacitor.

In timing diagram 700, the symbol "1" indicates that the respective capacitor of a given core is switchedly coupled to both the Vout bus and the Vin bus. By contrast, the symbol "2" indicates that the respective capacitor is instead switchedly coupled to both the Vout bus and the Vss bus. Furthermore, the symbol "VB" in timing diagram 700 indicates that the respective capacitor of the given core is switchedly coupled to both a given one of the first one or more "bottom" CRBs, and another of the multiple buses. By contrast, the symbol "VT" indicates that the respective capacitor is switchedly coupled to both a given one of the second one or more "top" CRBs, and another of the multiple buses.

In an illustrative scenario according to one embodiment, cores 710, 712 are coupled to each other—at some point between times t2, t3—via one of the first one or more "bottom" CRBs. Subsequently, at some point between times t3, t4, cores 710, 713 are coupled to each other via one of the first one or more CRBs. Furthermore, at some point between times t4, t5, cores 711, 713 are coupled to each other via one of the first one or more "bottom" CRBs.

Similarly, at some point between times t4, t5, cores 710, 712 are coupled to each other via one of the second one or more "top" CRBs. Subsequently, at some point between times t5, t6, cores 710, 713 are coupled to each other via one of the second one or more CRBs. Furthermore, at some point between times t6, t7, cores 711, 713 are coupled to each other via one of the second one or more "top" CRBs.

Such coupling between cores 710, . . . , 714 is provided (for example) based on some or all of the cores each implementing a respective sequence of switch modes, such as that shown in timing diagram 600. In one such embodiment, the timing of a first such sequence by a first core is offset from that of a second such sequence by a second core—e.g., due to different respective phases of control signals variously provided to the first and second cores.

Figure 8A:
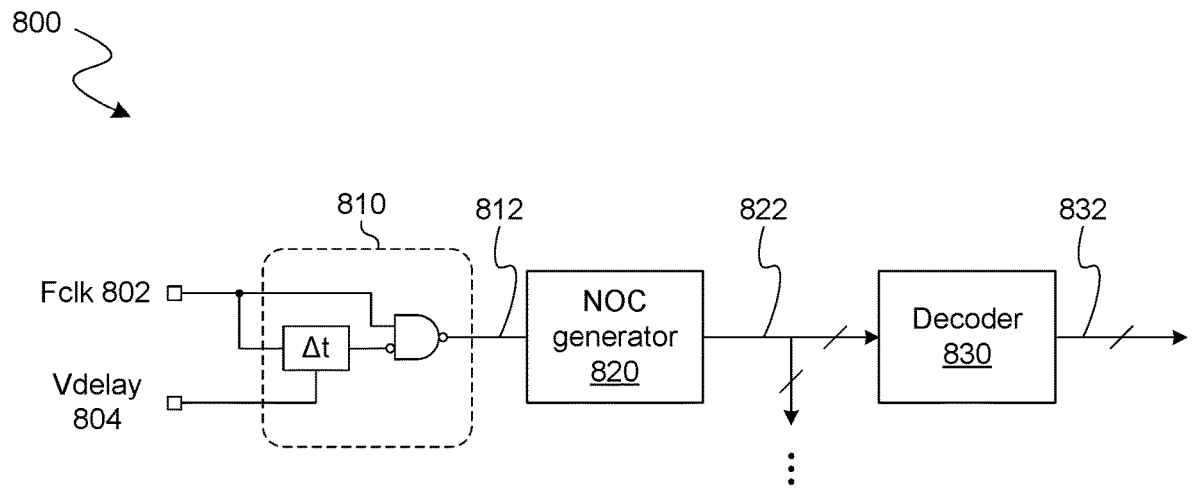
FIG. 8A shows a hybrid circuit and functional block diagram illustrating features of a switched-capacitor voltage regulator to control operation of a hierarchical switch network according to an embodiment.

FIG. 8A shows features of a controller 800 to control operation of a hierarchical switch network according to an embodiment. Controller 800 illustrates one example of an embodiment wherein switch control signals are generated, based on a reference clock signal, to determine operation of one or more HSNs. In various embodiments, controller 800 provides functionality such as that of one of control signal generator 140—e.g., wherein one or more operations of method 200 are performed with controller 800.

As shown in FIG. 8A, controller 800 comprises circuitry 810, a non-overlapping clock (NOC) generator 820, and a decoder 830 which are coupled in series with each other. Circuitry 810 is coupled to receive a periodic signal Folk 802 (such as Clk 128), and a delay signal Vdelay 804 which indicates a delay to be applied by circuitry 810. Based on clock signal Folk 802 and one delay signal Vdelay 804, circuitry 810 applies a variable delay Δt to generate a signal 812 which (for example) has a different duty cycle than that of signal Folk 802.

Signal 812 is provided to NOC generator 820, which comprises a programmable gate array (PGA), an application specific integrated circuit (ASIC), a state machine and/or other suitable circuitry to generate timing signals 822 based on signal 812. In an embodiment, timing signals 822 comprise periodic signals which have a same frequency, but which are offset from each other by different respective phases.

In one example embodiment, a frequency of the reference clock signal Folk 802 is divided-using NOC generator—into X phases of the different respective timing signals 822, where the total number X of timing signals 822 is equal to (2) (1+2N+2M), where N is a number of top side CRBs, and where M is a number of bottom side CRBs. Some or all of timing signals 822 are each provided to a respective converter core (not shown) of a SCVR—e.g., wherein each core of a SCVR's multiple converter cores receives a respective two of timing signals 822. In one such embodiment, a decoder 830 generates switch control signals 832—based on the received one or more of timing signals 822—which are variously provided to one or more HSNs of a given converter core. In one example embodiment, switch control signals 832 comprise some or all of control signals 411a-d, 413a-d, 415a-d, 417a-d, and 419a-d (and/or some or all of control signals 421a-d, 423a-d, 425a-d, 427a-d, and 429a-d, for example).

Figure 8B:
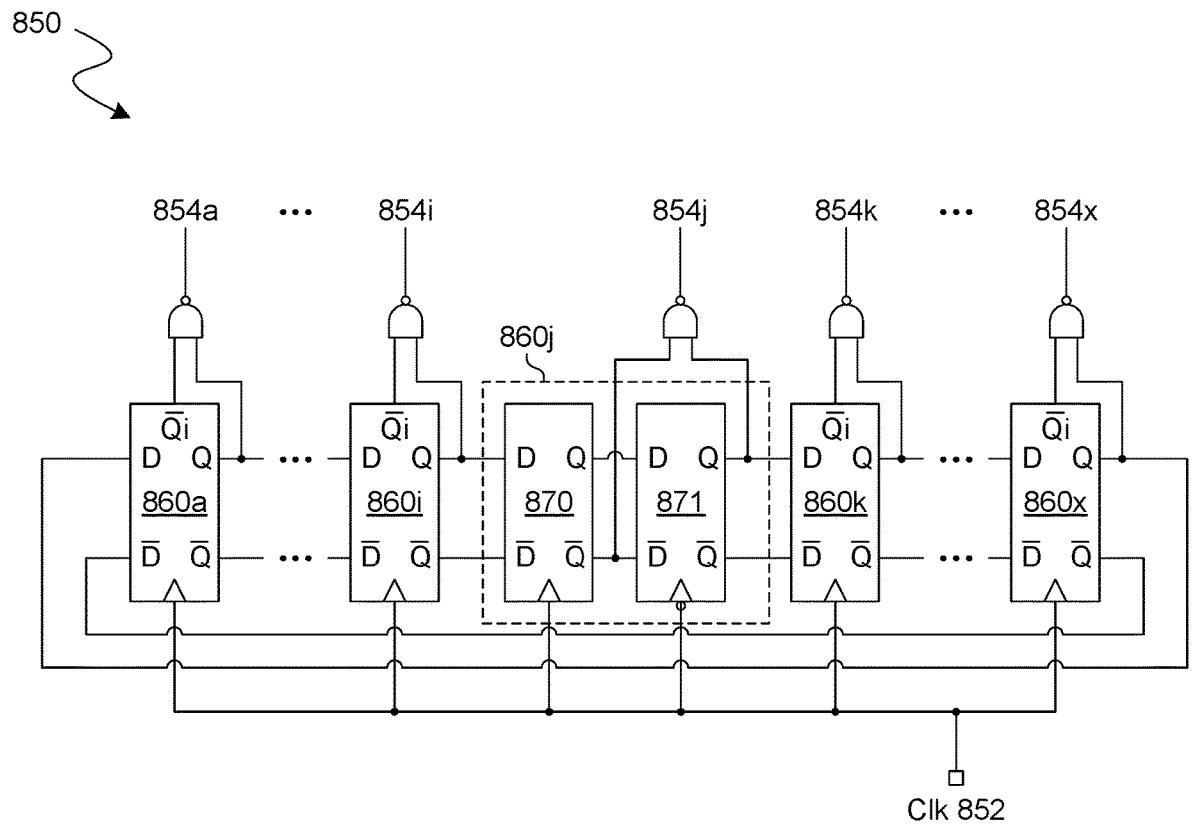
FIG. 8B shows a circuit diagram illustrating features of a non-overlapping clock generator to coordinate operation of a switched-capacitor voltage regulator according to an embodiment.

FIG. 8B shows features of a non-overlapping clock (NOC) generator 850 to coordinate operation of a switched-capacitor voltage regulator according to an embodiment. In various embodiments, non-overlapping clock generator 850 provides functionality such as that of non-overlapping clock generator 820.

As shown in FIG. 8B, non-overlapping clock generator 850 comprises multiple flip-flop circuits—such as the illustrative flip-flop circuits 860a, . . . , 860x shown—which are coupled, in sequence with each other, to form an in-series arrangement. Each of flip-flop circuits 860a, . . . , 860x is coupled to provide, to a next flip-flip circuit in the sequence, a respective Q signal, and a respective not-Q signal—e.g., wherein flip-flop circuit 860a receives the respective Q/not-Q signals of a last flip-flop circuit 860x of the sequence. Such communication of the respective Q/not-Q signals by flip-flop circuits 860a, . . . , 860x is coordinated, for example, with a signal 852 (such as signal 812).

In one such embodiment, non-overlapping clock generator 850 further comprises NAND gates which each correspond to a different respective one of flip-flop circuits 860a, . . . , 860x. Each such NAND gate is coupled to receive from the corresponding flip-flop circuit the respective Q signal, and a respective intermediate not-Q (or "not-Qi") signal. In various embodiment, a not-Qi signal is generated internally by a given flip-flop circuit. By way of illustration and not limitation, flip-flop circuit 860j (for example) itself comprises an in-series arrangement of two latch circuits 870, 871—e.g., wherein some or all others of flip-flop circuits 860a, . . . , 860x each similarly comprise a respective two latch circuits. In one such embodiment, the respective not-Qi signal output by flip-flop circuit 860j is a not-Q signal which latch circuit 870 provides to latch circuit 871.

Based on the respective Q/not-Qi signals provide by flip-flop circuits 860a, . . . , 860x, the NAND gates of SCVR 800 variously generate timing signals 854a, . . . , 854x, some or all of which are to determine phases (and corresponding switch states) of a given converter core. In an embodiment, timing signals 854i, . . . , 854x variously transition each between a respective two voltage levels—e.g., wherein respective edges of timing signals 854i, . . . , 854x are offset from each other in a non-overlapping manner according to the in-series arrangement of flip-flop circuits 860a, . . . , 860x. For example, at a given time, timing signal 854i undergoes a first transition between a voltage high level and a voltage low level, wherein a second transition by timing signal 854j is a next transition of timing signals 854a, . . . , 854x after the first transition of timing signal 854i. Similarly, a third transition of timing signal 854k is a next transition of timing signals 854a, . . . , 854x after the second transition of timing signal 854j.

Figure 9:
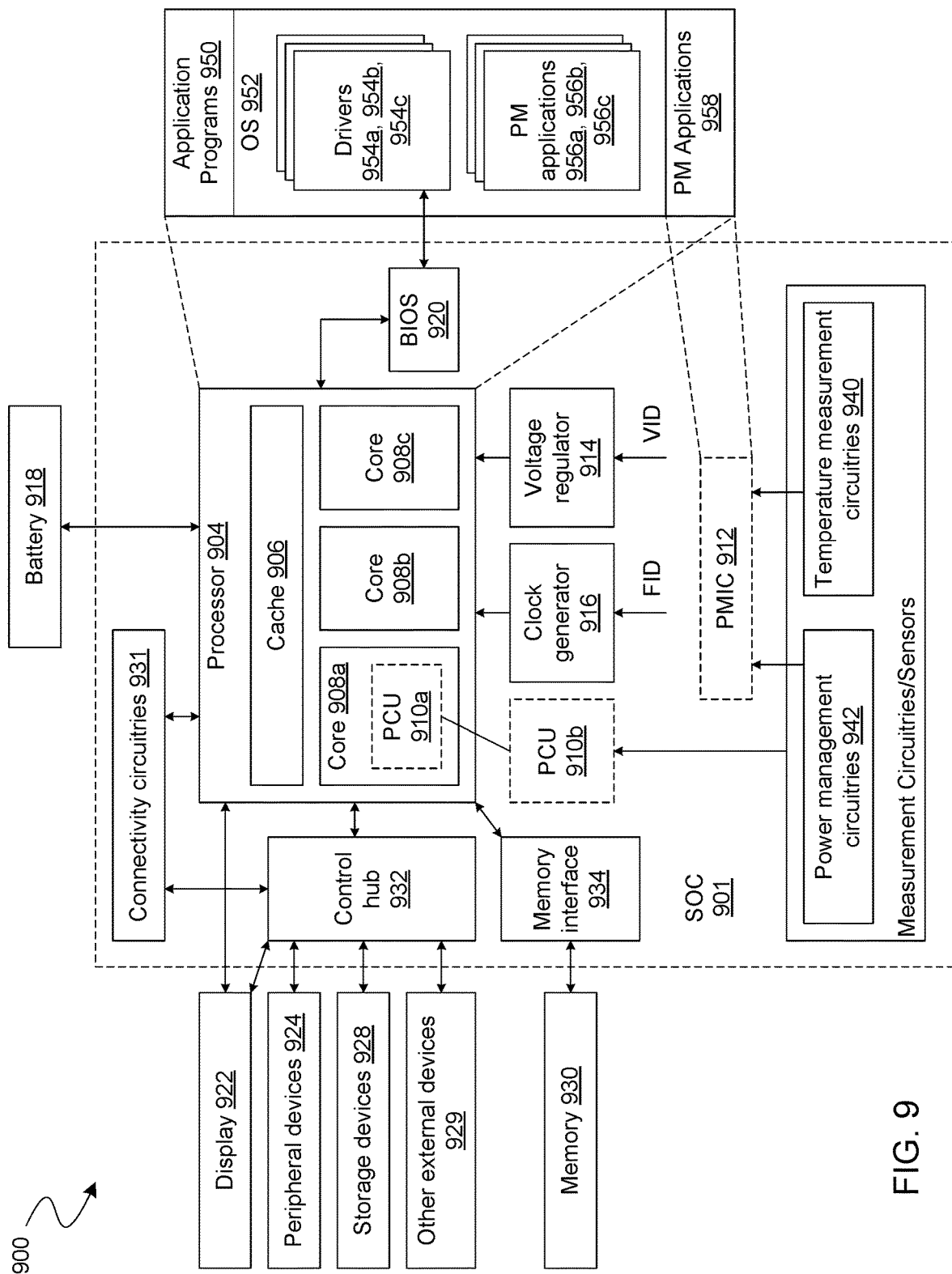
FIG. 9 shows a functional block diagram illustrating features of a computing device 900 to provide a regulated voltage according to an embodiment.

FIG. 9 illustrates a computer system or computing device 900 (also referred to as device 900), where functionality of a switched capacitor voltage regulator is provided with a hierarchical switch network, in accordance with some embodiments. It is pointed out that those elements of FIG. 9 having the same reference numbers (or names) as the elements of any other figure can operate or function in any manner similar to that described, but are not limited to such.

In some embodiments, device 900 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 900.

In an example, the device 900 comprises a SoC (System-on-Chip) 901. An example boundary of the SOC 901 is illustrated using dotted lines in FIG. 9, with some example components being illustrated to be included within SOC 901—however, SOC 901 may include any appropriate components of device 900.

In some embodiments, device 900 includes processor 904. Processor 2110 can include one or more physical devices, such as microprocessors, application processors, microcontrollers, programmable logic devices, processing cores, or other processing means. The processing operations performed by processor 904 include the execution of an operating platform or operating system on which applications and/or device functions are executed. The processing operations include operations related to I/O (input/output) with a human user or with other devices, operations related to power management, operations related to connecting computing device 900 to another device, and/or the like. The processing operations may also include operations related to audio I/O and/or display I/O.

In some embodiments, processor 904 includes multiple processing cores (also referred to as cores) 908a, 908b, 908c. Although merely three cores 908a, 908b, 908c are illustrated in FIG. 9, the processor 904 may include any other appropriate number of processing cores, e.g., tens, or even hundreds of processing cores. Processor cores 908a, 908b, 908c may be implemented on a single integrated circuit (IC) chip. Moreover, the chip may include one or more shared and/or private caches, buses or interconnections, graphics and/or memory controllers, or other components.

In some embodiments, processor 904 includes cache 906. In an example, sections of cache 906 may be dedicated to individual cores 908 (e.g., a first section of cache 906 dedicated to core 908a, a second section of cache 906 dedicated to core 908b, and so on). In an example, one or more sections of cache 906 may be shared among two or more of cores 908. Cache 906 may be split in different levels, e.g., level 1 (L1) cache, level 2 (L2) cache, level 3 (L3) cache, etc.

In some embodiments, a given processor core (e.g., core 908a) may include a fetch unit to fetch instructions (including instructions with conditional branches) for execution by the core 908a. The instructions may be fetched from any storage devices such as the memory 930. Processor core 908a may also include a decode unit to decode the fetched instruction. For example, the decode unit may decode the fetched instruction into a plurality of micro-operations. Processor core 908a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 908a (for example) may be an out-of-order processor core in one embodiment. Processor core 908a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 908a may also include a bus unit to enable communication between components of the processor core 908a and other components via one or more buses. Processor core 908a may also include one or more registers to store data accessed by various components of the core 908a (such as values related to assigned app priorities and/or sub-system states (modes) association.

In some embodiments, device 900 comprises connectivity circuitries 931. For example, connectivity circuitries 931 includes hardware devices (e.g., wireless and/or wired connectors and communication hardware) and/or software components (e.g., drivers, protocol stacks), e.g., to enable device 900 to communicate with external devices. Device 900 may be separate from the external devices, such as other computing devices, wireless access points or base stations, etc.

In an example, connectivity circuitries 931 may include multiple different types of connectivity. To generalize, the connectivity circuitries 931 may include cellular connectivity circuitries, wireless connectivity circuitries, etc. Cellular connectivity circuitries of connectivity circuitries 931 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 931 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 931 may include a network interface, such as a wired or wireless interface, e.g., so that a system embodiment may be incorporated into a wireless device, for example, cell phone or personal digital assistant.

In some embodiments, device 900 comprises control hub 932, which represents hardware devices and/or software components related to interaction with one or more I/O devices. For example, processor 904 may communicate with one or more of display 922, one or more peripheral devices 924, storage devices 928, one or more other external devices 929, etc., via control hub 932. Control hub 932 may be a chipset, a Platform Control Hub (PCH), and/or the like.

For example, control hub 932 illustrates one or more connection points for additional devices that connect to device 900, e.g., through which a user might interact with the system. For example, devices (e.g., devices 929) that can be attached to device 900 include microphone devices, speaker or stereo systems, audio devices, video systems or other display devices, keyboard or keypad devices, or other I/O devices for use with specific applications such as card readers or other devices.

As mentioned above, control hub 932 can interact with audio devices, display 922, etc. For example, input through a microphone or other audio device can provide input or commands for one or more applications or functions of device 900. Additionally, audio output can be provided instead of, or in addition to display output. In another example, if display 922 includes a touch screen, display 922 also acts as an input device, which can be at least partially managed by control hub 932. There can also be additional buttons or switches on computing device 900 to provide I/O functions managed by control hub 932. In one embodiment, control hub 932 manages devices such as accelerometers, cameras, light sensors or other environmental sensors, or other hardware that can be included in device 900. The input can be part of direct user interaction, as well as providing environmental input to the system to influence its operations (such as filtering for noise, adjusting displays for brightness detection, applying a flash for a camera, or other features).

In some embodiments, control hub 932 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 922 represents hardware (e.g., display devices) and software (e.g., drivers) components that provide a visual and/or tactile display for a user to interact with device 900. Display 922 may include a display interface, a display screen, and/or hardware device used to provide a display to a user. In some embodiments, display 922 includes a touch screen (or touch pad) device that provides both output and input to a user. In an example, display 922 may communicate directly with the processor 904. Display 922 can be one or more of an internal display device, as in a mobile electronic device or a laptop device or an external display device attached via a display interface (e.g., DisplayPort, etc.). In one embodiment display 922 can be a head mounted display (HMD) such as a stereoscopic display device for use in virtual reality (VR) applications or augmented reality (AR) applications.

In some embodiments and although not illustrated in the figure, in addition to (or instead of) processor 904, device 900 may include Graphics Processing Unit (GPU) comprising one or more graphics processing cores, which may control one or more aspects of displaying contents on display 922.

Control hub 932 (or platform controller hub) may include hardware interfaces and connectors, as well as software components (e.g., drivers, protocol stacks) to make peripheral connections, e.g., to peripheral devices 924.

It will be understood that device 900 could both be a peripheral device to other computing devices, as well as have peripheral devices connected to it. Device 900 may have a "docking" connector to connect to other computing devices for purposes such as managing (e.g., downloading and/or uploading, changing, synchronizing) content on device 900. Additionally, a docking connector can allow device 900 to connect to certain peripherals that allow computing device 900 to control content output, for example, to audiovisual or other systems.

In addition to a proprietary docking connector or other proprietary connection hardware, device 900 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 931 may be coupled to control hub 932, e.g., in addition to, or instead of, being coupled directly to the processor 904. In some embodiments, display 922 may be coupled to control hub 932, e.g., in addition to, or instead of, being coupled directly to processor 904.

In some embodiments, device 900 comprises memory 930 coupled to processor 904 via memory interface 934. Memory 930 includes memory devices for storing information in device 900. Memory can include nonvolatile (state does not change if power to the memory device is interrupted) and/or volatile (state is indeterminate if power to the memory device is interrupted) memory devices. Memory device 930 can be a dynamic random access memory (DRAM) device, a static random access memory (SRAM) device, flash memory device, phase-change memory device, or some other memory device having suitable performance to serve as process memory. In one embodiment, memory 930 can operate as system memory for device 900, to store data and instructions for use when the one or more processors 904 executes an application or process. Memory 930 can store application data, user data, music, photos, documents, or other data, as well as system data (whether long-term or temporary) related to the execution of the applications and functions of device 900.

Elements of various embodiments and examples are also provided as a machine-readable medium (e.g., memory 930) for storing the computer-executable instructions (e.g., instructions to implement any other processes discussed herein). The machine-readable medium (e.g., memory 930) may include, but is not limited to, flash memory, optical disks, CD-ROMs, DVD ROMs, RAMS, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 900 comprises temperature measurement circuitries 940, e.g., for measuring temperature of various components of device 900. In an example, temperature measurement circuitries 940 may be embedded, or coupled or attached to various components, whose temperature are to be measured and monitored. For example, temperature measurement circuitries 940 may measure temperature of (or within) one or more of cores 908*a*, 908*b*, 908*c*, voltage regulator 914, memory 930, a mother-board of SOC 901, and/or any appropriate component of device 900.

In some embodiments, device 900 comprises power measurement circuitries 942, e.g., for measuring power consumed by one or more components of the device 900. In an example, in addition to, or instead of, measuring power, the power measurement circuitries 942 may measure voltage and/or current. In an example, the power measurement circuitries 942 may be embedded, or coupled or attached to various components, whose power, voltage, and/or current consumption are to be measured and monitored. For example, power measurement circuitries 942 may measure power, current and/or voltage supplied by one or more voltage regulators 914, power supplied to SOC 901, power supplied to device 900, power consumed by processor 904 (or any other component) of device 900, etc.

In some embodiments, device 900 comprises one or more voltage regulator circuitries, generally referred to as voltage regulator (VR) 914. VR 914 generates signals at appropriate voltage levels, which may be supplied to operate any appropriate components of the device 900. Merely as an example, VR 914 is illustrated to be supplying signals to processor 904 of device 900. In some embodiments, VR 914 receives one or more Voltage Identification (VID) signals, and generates the voltage signal at an appropriate level, based on the VID signals. Various type of VRs may be utilized for the VR 914. For example, VR 914 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 910*a/b* and/or PMIC 912. In some embodiments, each core has a network of distributed LDOs to provide efficient control for power management. The LDOs can be digital, analog, or a combination of digital or analog LDOs.

In some embodiments, device 900 comprises one or more clock generator circuitries, generally referred to as clock generator 916. Clock generator 916 generates clock signals at appropriate frequency levels, which may be supplied to any appropriate components of device 900. Merely as an example, clock generator 916 is illustrated to be supplying clock signals to processor 904 of device 900. In some embodiments, clock generator 916 receives one or more Frequency Identification (FID) signals, and generates the clock signals at an appropriate frequency, based on the FID signals.

In some embodiments, device 900 comprises battery 918 supplying power to various components of device 900. Merely as an example, battery 918 is illustrated to be supplying power to processor 904. Although not illustrated in the figures, device 900 may comprise a charging circuitry, e.g., to recharge the battery, based on Alternating Current (AC) power supply received from an AC adapter.

In some embodiments, device 900 comprises Power Control Unit (PCU) 910 (also referred to as Power Management Unit (PMU), Power Controller, etc.). In an example, some sections of PCU 910 may be implemented by one or more processing cores 908, and these sections of PCU 910 are symbolically illustrated using a dotted box and labelled PCU 910*a*. In an example, some other sections of PCU 910 may be implemented outside the processing cores 908, and these sections of PCU 910 are symbolically illustrated using a dotted box and labelled as PCU 910*b*. PCU 910 may implement various power management operations for device 900. PCU 910 may include hardware interfaces, hardware circuitries, connectors, registers, etc., as well as software components (e.g., drivers, protocol stacks), to implement various power management operations for device 900.

In some embodiments, device 900 comprises Power Management Integrated Circuit (PMIC) 912, e.g., to implement various power management operations for device 900. In some embodiments, PMIC 912 is a Reconfigurable Power Management ICs (RPMICs) and/or an IMVP (Intel® Mobile Voltage Positioning). In an example, the PMIC is within an IC chip separate from processor 904. The may implement various power management operations for device 900. PMIC 912 may include hardware interfaces, hardware circuitries, connectors, registers, etc., as well as software components (e.g., drivers, protocol stacks), to implement various power management operations for device 900.

In an example, device 900 comprises one or both PCU 910 or PMIC 912. In an example, any one of PCU 910 or PMIC 912 may be absent in device 900, and hence, these components are illustrated using dotted lines.

Various power management operations of device 900 may be performed by PCU 910, by PMIC 912, or by a combination of PCU 910 and PMIC 912. For example, PCU 910 and/or PMIC 912 may select a power state (e.g., P-state) for various components of device 900. For example, PCU 910 and/or PMIC 912 may select a power state (e.g., in accordance with the ACPI (Advanced Configuration and Power Interface) specification) for various components of device 900. Merely as an example, PCU 910 and/or PMIC 912 may cause various components of the device 900 to transition to a sleep state, to an active state, to an appropriate C state (e.g., C0 state, or another appropriate C state, in accordance with the ACPI specification), etc. In an example, PCU 910 and/or PMIC 912 may control a voltage output by VR 914 and/or a frequency of a clock signal output by the clock generator, e.g., by outputting the VID signal and/or the FID signal, respectively. In an example, PCU 910 and/or PMIC 912 may control battery power usage, charging of battery 918, and features related to power saving operation.

The clock generator 916 can comprise a phase locked loop (PLL), frequency locked loop (FLL), or any suitable clock source. In some embodiments, each core of processor 904 has its own clock source. As such, each core can operate at a frequency independent of the frequency of operation of the other core. In some embodiments, PCU 910 and/or PMIC 912 performs adaptive or dynamic frequency scaling or adjustment. For example, clock frequency of a processor core can be increased if the core is not operating at its maximum power consumption threshold or limit. In some embodiments, PCU 910 and/or PMIC 912 determines the operating condition of each core of a processor, and opportunistically adjusts frequency and/or power supply voltage of that core without the core clocking source (e.g., PLL of that core) losing lock when the PCU 910 and/or PMIC 912 determines that the core is operating below a target performance level. For example, if a core is drawing current from a power supply rail less than a total current allocated for that core or processor 904, then PCU 910 and/or PMIC 912 can temporarily increase the power draw for that core or processor 904 (e.g., by increasing clock frequency and/or power supply voltage level) so that the core or processor 904 can perform at a higher performance level. As such, voltage and/or frequency can be increased temporality for processor 904 without violating product reliability.

In an example, PCU 910 and/or PMIC 912 may perform power management operations, e.g., based at least in part on receiving measurements from power measurement circuitries 942, temperature measurement circuitries 940, charge level of battery 918, and/or any other appropriate information that may be used for power management. To that end, PMIC 912 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 910 and/or PMIC 912 in at least one embodiment to allow PCU 910 and/or PMIC 912 to manage processor core energy at least in part based on value(s) detected by one or more of the sensors.

Also illustrated is an example software stack of device 900 (although not all elements of the software stack are illustrated). Merely as an example, processors 904 may execute application programs 950, Operating System 952, one or more Power Management (PM) specific application programs (e.g., generically referred to as PM applications 958), and/or the like. PM applications 958 may also be executed by the PCU 910 and/or PMIC 912. OS 952 may also include one or more PM applications 956a, 956b, 956c. The OS 952 may also include various drivers 954a, 954b, 954c, etc., some of which may be specific for power management purposes. In some embodiments, device 900 may further comprise a Basic Input/Output System (BIOS) 920. BIOS 920 may communicate with OS 952 (e.g., via one or more drivers 954), communicate with processors 904, etc.

For example, one or more of PM applications 958, 956, drivers 954, BIOS 920, etc. may be used to implement power management specific tasks, e.g., to control voltage and/or frequency of various components of device 900, to control wake-up state, sleep state, and/or any other appropriate power state of various components of device 900, control battery power usage, charging of the battery 918, features related to power saving operation, etc.

In an embodiment, VR 914 comprises SCVR circuitry including multiple converter cores which are coupled in parallel with each other. The cores, which comprise respective capacitors, are coupled to each other via multiple buses including one or more charge redistribution buses. A distribution of charges between some or all of the respective capacitors is facilitated with respective switch circuitry of the converter cores. In one such embodiment, a first core of the multiple converter cores includes a hierarchical switch network which selectively enables coupling of a first capacitor of the first core with various ones of the multiple buses.

In one or more first embodiments, a voltage converter comprises multiple buses comprising a first bus to receive a first voltage, a second bus to provide a second voltage, one or more third buses, a first converter core comprising a capacitor comprising a first terminal, and a first hierarchical switch network (HSN) coupled to the first terminal, the first HSN to receive a first one or more control signals, and, based on the first one or more control signals, to selectively provide any of first conductive paths each between the first terminal and a different respective bus of the multiple buses, and a second converter core coupled to the first converter core via each of the first bus, the second bus, and the one or more third buses, wherein the voltage converter is to generate the second voltage based on the first voltage, comprising the first converter core and the second converter core to distribute charges with the one or more third buses.

In one or more second embodiments, further to the first embodiment, the first HSN comprises a first level comprising first switch circuits, and a second level comprising second switch circuits and third switch circuits, wherein one of the first switch circuits is coupled between the capacitor and each of the second switch circuits, and wherein another of the first switch circuits is coupled between the capacitor and each of the third switch circuits.

In one or more third embodiments, further to the second embodiment, for each of the second switch circuits and the third switch circuits, the switch circuit is coupled to one of the first bus, the second bus, or a respective one of the one or more third buses.

In one or more fourth embodiments, further to the first embodiment, the multiple buses further comprise a fourth bus coupled to each of the first converter core and the second converter core, the fourth bus to receive a third voltage, and one or more fifth buses coupled to each of the first converter core and the second converter core, wherein the capacitor further comprises a second terminal, wherein the first converter core further comprises a second HSN coupled to the second terminal, the second HSN to receive a second one or more control signals and, based on the second one or more control signals, to selectively provide any of second conductive paths each between the second terminal and a different respective bus of the multiple buses, and wherein the voltage converter is to generate the second voltage further based on the third voltage, comprising the first converter core and the second converter core to further distribute the charges with the one or more fifth buses.

In one or more fifth embodiments, further to the fourth embodiment, the first HSN comprises a first level comprising first switch circuits, and a second level comprising second switch circuits and third switch circuits, wherein one of the first switch circuits is coupled between the capacitor and each of the second switch circuits, and wherein another of the first switch circuits is coupled between the capacitor and each of the third switch circuits.

In one or more sixth embodiments, further to the fifth embodiment, for each of the second switch circuits and the third switch circuits, the switch circuit is coupled to one of the first bus, the second bus, or a respective one of the one or more third buses.

In one or more seventh embodiments, further to the fifth embodiment, the second HSN comprises a third level comprising fourth switch circuits, and a fourth level comprising fifth switch circuits and sixth switch circuits, wherein one of the fourth switch circuits is coupled between the capacitor and each of the fifth switch circuits, and wherein another of the fourth switch circuits is coupled between the capacitor and each of the sixth switch circuits.

In one or more eighth embodiments, further to the seventh embodiment, for each of the fourth switch circuits and the fifth switch circuits, the switch circuit is coupled to one of the second bus, the fourth bus, or a respective one of the one or more fifth buses.

In one or more ninth embodiments, further to the first embodiment, the voltage converter further comprises first circuitry to generate the first one or more control signals, wherein, based on the first one or more control signals, the first converter core is to provide a first sequence of a first plurality of modes of the first HSN, the first plurality of modes comprising a first mode wherein the first HSN is to provide a first conductive path between the first bus and the second bus via the capacitor, and one or more second modes each corresponding to a different respective bus of the one or more third buses, wherein for each mode of the one or more second modes, the mode provides a respective conductive path between the second bus and the corresponding bus of the one or more third buses via the capacitor.

In one or more tenth embodiments, further to the ninth embodiment, the first HSN comprises a first level comprising first switch circuits, and a second level comprising second switch circuits and third switch circuits, wherein one of the first switch circuits is coupled between the capacitor and each of the second switch circuits, wherein another of the first switch circuits is coupled between the capacitor and each of the third switch circuits, and wherein the first converter core to provide the first sequence comprises the first HSN is to activate the one of the first switch circuits and, while the first switch circuit is activated, to successively activate the second switch circuits.

In one or more eleventh embodiments, further to the ninth embodiment, the multiple buses further comprise a fourth bus coupled to each of the first converter core and the second converter core, the fourth bus to receive a third voltage, and one or more fifth buses coupled to each of the first converter core and the second converter core, wherein the capacitor further comprises a second terminal, wherein the first converter core further comprises a second HSN coupled to the second terminal, the second HSN to receive a second one or more control signals and, based on the second one or more control signals, to selectively provide any of second conductive paths each between the second terminal and a different respective bus of the multiple buses, and wherein the voltage converter is to generate the second voltage further based on the third voltage, comprising the first converter core and the second converter core to further distribute the charge with the one or more fifth buses.

In one or more twelfth embodiments, further to the eleventh embodiment, the first circuitry is further to generate the second one or more control signals, wherein, based on the second one or more control signals, the first converter core is to provide a second sequence of a second plurality of modes of the second HSN, the second plurality of modes comprising a third mode wherein the second HSN is to provide a second conductive path between the second bus and the third bus via the capacitor, and one or more fourth modes each corresponding to a different respective bus of the one or more fifth buses, wherein for each mode of the one or more fourth modes, the mode provides a respective conductive path between the second bus and the corresponding bus of the one or more fifth buses via the capacitor.

In one or more thirteenth embodiments, further to the twelfth embodiment, based on the first one or more control signals and the second one or more control signals, the first converter core is to provide a third sequence of a third plurality of modes of the first HSN and the second HSN, the third plurality of modes each corresponding to a different respective bus of the one or more fifth buses, wherein for each mode of the third plurality of modes, the mode provides a respective conductive path between the first bus and the corresponding bus of the one or more fifth buses via the capacitor.

In one or more fourteenth embodiments, further to the thirteenth embodiment, based on the first one or more control signals and the second one or more control signals, the first converter core is to provide a fourth sequence of a fourth plurality of modes of the first HSN and the second HSN, the fourth plurality of modes each corresponding to a different respective bus of the one or more third buses, wherein for each mode of the fourth plurality of modes, the mode provides a respective conductive path between the fourth bus and the corresponding bus of the one or more third buses via the capacitor.

In one or more fifteenth embodiments, further to the first embodiment, the second converter core comprises a second capacitor comprising a second terminal, and a second HSN coupled to the second terminal, the second HSN to receive a second one or more control signals, and, based on the second one or more control signals, to selectively provide any of second conductive paths each between the second terminal and a different respective bus of the multiple buses.

In one or more sixteenth embodiments, an integrated circuit comprises multiple buses comprising a first bus to receive a first voltage, a second bus to provide a second voltage, one or more third buses, converter cores each coupled to the multiple buses, the converter cores each comprising a respective capacitor, and a respective first hierarchical switch network (HSN) coupled to a first terminal of the respective capacitor, first circuitry coupled to provide control signals each to a respective one of the converter cores, wherein for each of the converter cores, the respective first HSN is to selectively provide, based on the control signals, any of respective first conductive paths each between the first terminal of the respective capacitor and a different respective bus of the multiple buses, and wherein the converter cores are to generate the second voltage based on the first voltage, comprising the converter cores to distribute charges with the one or more third buses.

In one or more seventeenth embodiments, further to the sixteenth embodiment, the multiple buses further comprise a fourth bus coupled to each of the converter cores, the fourth bus to receive a third voltage, and one or more fifth buses coupled to each of the converter cores, wherein, for each of the converter cores the core further comprises a respective second HSN coupled to a second terminal of the respective capacitor, and the respective second HSN is to selectively provide, based on the control signals, any of respective second conductive paths each between the second terminal of the respective capacitors and a different respective bus of the multiple buses, and wherein the converter cores are to generate the second voltage further based on the third voltage, comprising the converter cores to further distribute the charges with the one or more fifth buses.

In one or more eighteenth embodiments, further to the seventeenth embodiment, the converter cores comprises a first converter core, wherein the respective first HSN of the first converter core comprises a first level comprising first switch circuits, and a second level comprising second switch circuits and third switch circuits, wherein one of the first switch circuits is coupled between the capacitor and each of the second switch circuits, and wherein another of the first switch circuits is coupled between the capacitor and each of the third switch circuits.

In one or more nineteenth embodiments, further to the eighteenth embodiment, for each of the second switch circuits and the third switch circuits, the switch circuit is coupled to one of the first bus, the second bus, or a respective one of the one or more third buses.

In one or more twentieth embodiments, further to the nineteenth embodiment, the respective second HSN of the first converter core comprises a third level comprising fourth switch circuits, and a fourth level comprising fifth switch circuits and sixth switch circuits, wherein one of the fourth switch circuits is coupled between the capacitor and each of the fifth switch circuits, and wherein another of the fourth switch circuits is coupled between the capacitor and each of the sixth switch circuits.

In one or more twenty-first embodiments, further to the twentieth embodiment, for each of the fourth switch circuits and the fifth switch circuits, the switch circuit is coupled to one of the second bus, the fourth bus, or a respective one of the one or more fifth buses.

In one or more twenty-second embodiments, further to the sixteenth embodiment, the converter cores comprises a first converter core, wherein the respective first HSN of the first converter core comprises a first level comprising first switch circuits, and a second level comprising second switch circuits and third switch circuits, wherein one of the first switch circuits is coupled between the respective capacitor and each of the second switch circuits, and wherein another of the first switch circuits is coupled between the capacitor and each of the third switch circuits.

In one or more twenty-third embodiments, further to the twenty-second embodiment, for each of the second switch circuits and the third switch circuits, the switch circuit is coupled to one of the first bus, the second bus, or a respective one of the one or more third buses.

In one or more twenty-fourth embodiments, further to the sixteenth embodiment, the converter cores comprises a first converter core, and wherein, based on the control signals, the first converter core is to provide a first sequence of a first plurality of modes of the respective first HSN, the first plurality of modes comprising a first mode wherein the respective first HSN is to provide a first conductive path between the first bus and the second bus via the respective capacitor, and one or more second modes each corresponding to a different respective bus of the one or more third buses, wherein for each mode of the one or more second modes, the mode provides a respective conductive path between the second bus and the corresponding bus of the one or more third buses via the respective capacitor.

In one or more twenty-fifth embodiments, further to the twenty-fourth embodiment, the respective first HSN comprises a first level comprising first switch circuits, and a second level comprising second switch circuits and third switch circuits, wherein one of the first switch circuits is coupled between the respective capacitor and each of the second switch circuits, wherein another of the first switch circuits is coupled between the respective capacitor and each of the third switch circuits, and wherein the first converter core to provide the first sequence comprises the respective first HSN is to activate the one of the first switch circuits and, while the first switch circuit is activated, to successively activate the second switch circuits.

In one or more twenty-sixth embodiments, further to the twenty-fourth embodiment, the multiple buses further comprise a fourth bus coupled to each of the first converter core and the second converter core, the fourth bus to receive a third voltage, and one or more fifth buses coupled to each of the first converter core and the second converter core, wherein the respective capacitor further comprises a second terminal, wherein the first converter core further comprises a second HSN coupled to the second terminal, the second HSN to receive a second one or more control signals and, based on the second one or more control signals, to selectively provide any of second conductive paths each between the second terminal and a different respective bus of the multiple buses, and wherein the voltage converter is to generate the second voltage further based on the third voltage, comprising the first converter core and the second converter core to further distribute the charges with the one or more fifth buses.

In one or more twenty-seventh embodiments, further to the twenty-sixth embodiment, the first circuitry is further to generate the second one or more control signals, wherein, based on the second one or more control signals, the first converter core is to provide a second sequence of a second plurality of modes of the second HSN, the second plurality of modes comprising a third mode wherein the second HSN is to provide a second conductive path between the second bus and the third bus via the respective capacitor, and one or more fourth modes each corresponding to a different respective bus of the one or more fifth buses, wherein for each mode of the one or more fourth modes, the mode provides a respective conductive path between the second bus and the corresponding bus of the one or more fifth buses via the respective capacitor.

In one or more twenty-eighth embodiments, further to the twenty-seventh embodiment, based on the first one or more control signals and the second one or more control signals, the first converter core is to provide a third sequence of a third plurality of modes of the respective first HSN and the second HSN, the third plurality of modes each corresponding to a different respective bus of the one or more fifth buses, wherein for each mode of the third plurality of modes, the mode provides a respective conductive path between the first bus and the corresponding bus of the one or more fifth buses via the respective capacitor.

In one or more twenty-ninth embodiments, further to the twenty-eighth embodiment, based on the first one or more control signals and the second one or more control signals, the first converter core is to provide a fourth sequence of a fourth plurality of modes of the respective first HSN and the second HSN, the fourth plurality of modes each corresponding to a different respective bus of the one or more third buses, wherein for each mode of the fourth plurality of modes, the mode provides a respective conductive path between the fourth bus and the corresponding bus of the one or more third buses via the respective capacitor.

In one or more thirtieth embodiments, a system comprises an integrated circuit comprising multiple buses comprising a first bus to receive a first voltage, a second bus to provide a second voltage, one or more third buses, converter cores each coupled to the multiple buses, the converter cores each comprising a respective capacitor, and a respective first hierarchical switch network (HSN) coupled to a first terminal of the respective capacitor, first circuitry coupled to provide control signals each to a respective one of the converter cores, wherein for each of the converter cores, the respective first HSN is to selectively provide, based on the control signals, any of respective first conductive paths each between the first terminal of the respective capacitor and a different respective bus of the multiple buses, and wherein the converter cores are to generate the second voltage based on the first voltage, comprising the converter cores to distribute charges with the one or more third buses, a processor core and a memory to execute an operating system, the processor core coupled to receive power from the integrated circuit based on the second voltage, and a display device coupled to the processor, the display device to display an image based on a signal communicated with the processor.

In one or more thirty-first embodiments, further to the thirtieth embodiment, the multiple buses further comprise a fourth bus coupled to each of the converter cores, the fourth bus to receive a third voltage, and one or more fifth buses coupled to each of the converter cores, wherein, for each of the converter cores the core further comprises a respective second HSN coupled to a second terminal of the respective capacitor, and the respective second HSN is to selectively provide, based on the control signals, any of respective second conductive paths each between the second terminal of the respective capacitors and a different respective bus of the multiple buses, and wherein the converter cores are to generate the second voltage further based on the third voltage, comprising the converter cores to further distribute the charges with the one or more fifth buses.

In one or more thirty-second embodiments, further to the thirty-first embodiment, the converter cores comprises a first converter core, wherein the respective first HSN of the first converter core comprises a first level comprising first switch circuits, and a second level comprising second switch circuits and third switch circuits, wherein one of the first switch circuits is coupled between the capacitor and each of the second switch circuits, and wherein another of the first switch circuits is coupled between the capacitor and each of the third switch circuits.

In one or more thirty-third embodiments, further to the thirty-second embodiment, for each of the second switch circuits and the third switch circuits, the switch circuit is coupled to one of the first bus, the second bus, or a respective one of the one or more third buses.

In one or more thirty-fourth embodiments, further to the thirty-second embodiment, the respective second HSN of the first converter core comprises a third level comprising fourth switch circuits, and a fourth level comprising fifth switch circuits and sixth switch circuits, wherein one of the fourth switch circuits is coupled between the capacitor and each of the fifth switch circuits, and wherein another of the fourth switch circuits is coupled between the capacitor and each of the sixth switch circuits.

In one or more thirty-fifth embodiments, further to the thirty-fourth embodiment, for each of the fourth switch circuits and the fifth switch circuits, the switch circuit is coupled to one of the second bus, the fourth bus, or a respective one of the one or more fifth buses.

In one or more thirty-sixth embodiments, further to the thirtieth embodiment, the converter cores comprises a first converter core, wherein the respective first HSN of the first converter core comprises a first level comprising first switch circuits, and a second level comprising second switch circuits and third switch circuits, wherein one of the first switch circuits is coupled between the respective capacitor and each of the second switch circuits, and wherein another of the first switch circuits is coupled between the capacitor and each of the third switch circuits.

In one or more thirty-seventh embodiments, further to the thirty-sixth embodiment, for each of the second switch circuits and the third switch circuits, the switch circuit is coupled to one of the first bus, the second bus, or a respective one of the one or more third buses.

In one or more thirty-eighth embodiments, further to the thirtieth embodiment, the converter cores comprises a first converter core, and wherein, based on the control signals, the first converter core is to provide a first sequence of a first plurality of modes of the respective first HSN, the first plurality of modes comprising a first mode wherein the respective first HSN is to provide a first conductive path between the first bus and the second bus via the respective capacitor, and one or more second modes each corresponding to a different respective bus of the one or more third buses, wherein for each mode of the one or more second modes, the mode provides a respective conductive path between the second bus and the corresponding bus of the one or more third buses via the respective capacitor.

In one or more thirty-ninth embodiments, further to the thirty-eighth embodiment, the respective first HSN comprises a first level comprising first switch circuits, and a second level comprising second switch circuits and third switch circuits, wherein one of the first switch circuits is coupled between the respective capacitor and each of the second switch circuits, wherein another of the first switch circuits is coupled between the respective capacitor and each of the third switch circuits, and wherein the first converter core to provide the first sequence comprises the respective first HSN is to activate the one of the first switch circuits and, while the first switch circuit is activated, to successively activate the second switch circuits.

In one or more fortieth embodiments, further to the thirty-eighth embodiment, the multiple buses further comprise a fourth bus coupled to each of the first converter core and the second converter core, the fourth bus to receive a third voltage, and one or more fifth buses coupled to each of the first converter core and the second converter core, wherein the respective capacitor further comprises a second terminal, wherein the first converter core further comprises a second HSN coupled to the second terminal, the second HSN to receive a second one or more control signals and, based on the second one or more control signals, to selectively provide any of second conductive paths each between the second terminal and a different respective bus of the multiple buses, and wherein the voltage converter is to generate the second voltage further based on the third voltage, comprising the first converter core and the second converter core to further distribute the charges with the one or more fifth buses.

In one or more forty-first embodiments, further to the fortieth embodiment, the first circuitry is further to generate the second one or more control signals, wherein, based on the second one or more control signals, the first converter core is to provide a second sequence of a second plurality of modes of the second HSN, the second plurality of modes comprising a third mode wherein the second HSN is to provide a second conductive path between the second bus and the third bus via the respective capacitor, and one or more fourth modes each corresponding to a different respective bus of the one or more fifth buses, wherein for each mode of the one or more fourth modes, the mode provides a respective conductive path between the second bus and the corresponding bus of the one or more fifth buses via the respective capacitor.

In one or more forty-second embodiments, further to the forty-first embodiment, based on the first one or more control signals and the second one or more control signals, the first converter core is to provide a third sequence of a third plurality of modes of the respective first HSN and the second HSN, the third plurality of modes each corresponding to a different respective bus of the one or more fifth buses, wherein for each mode of the third plurality of modes, the mode provides a respective conductive path between the first bus and the corresponding bus of the one or more fifth buses via the respective capacitor.

In one or more forty-third embodiments, further to the forty-second embodiment, based on the first one or more control signals and the second one or more control signals, the first converter core is to provide a fourth sequence of a fourth plurality of modes of the respective first HSN and the second HSN, the fourth plurality of modes each corresponding to a different respective bus of the one or more third buses, wherein for each mode of the fourth plurality of modes, the mode provides a respective conductive path between the fourth bus and the corresponding bus of the one or more third buses via the respective capacitor.

In one or more forty-fourth embodiments, a method comprises receiving a first voltage at a first converter core via a first bus, wherein the first converter core comprises a capacitor, and a first hierarchical switch network (HSN) coupled to the capacitor, wherein the first HSN comprises a first switch circuit, a second switch circuit, and a third switch circuit, receiving a first one or more control signals at the first HSN, generating a second voltage based on the first voltage by operating the first HSN with the first one or more control signals, wherein during a first mode of the first HSN, first charges are distributed with the capacitor and one or more other converter cores via the first switch circuit, the second switch circuit, and one of multiple buses comprising the first bus, a second bus and one or more third buses, and during a second mode of the first HSN, second charges are distributed with the capacitor and the one or more other converter cores via the first switch circuit, the third switch circuit, and another of the multiple buses, and providing the second voltage via the second bus.

In one or more forty-fifth embodiments, further to the forty-fourth embodiment, a first level of the first HSN comprises a first plurality of switch circuits comprising the first switch circuit, wherein a second level of the first HSN comprises a second plurality of switch circuits comprising the second switch circuit and the third switch circuit, and wherein each switch circuit of the first plurality of switch circuits is coupled between the capacitor and a corresponding two or more switch circuits of the second plurality of switch circuits.

In one or more forty-sixth embodiments, further to the forty-fifth embodiment, for each switch circuit of the second plurality of switch circuits, the switch circuit is coupled between the first level and a different respective bus of the first bus, the second bus, and the one or more third buses.

In one or more forty-seventh embodiments, further to the forty-fourth embodiment, the multiple buses further comprises a fourth bus and one or more fifth buses, the multiple buses each coupled to the first converter core and to each of the one or more other converter cores, wherein the first HSN is coupled to a first terminal of the capacitor, wherein the first converter core further comprises a second HSN coupled to a second terminal of the capacitor, wherein the second HSN comprises a fourth switch circuit, a fifth switch circuit, and a sixth switch circuit, the method further comprises receiving a third voltage at the first converter via the fourth bus, receiving a second one or more control signals at the second HSN, wherein generating the second voltage is further based on the third voltage, and further comprises operating the second HSN with the first one or more control signals, wherein during a third mode of the second HSN, third charges are distributed with the capacitor and the one or more other converter cores via the fourth switch circuit, the fifth switch circuit, and a bus of the fourth bus and the fifth one or more buses, and during a fourth mode of the second HSN, fourth charges are distributed with the capacitor and the one or more other converter cores via the fourth switch circuit, the sixth switch circuit, and another bus of the fourth bus and the fifth one or more buses.

In one or more forty-eighth embodiments, further to the forty-seventh embodiment, a first level of the first HSN comprises a first plurality of switch circuits comprising the first switch circuit, wherein a second level of the first HSN comprises a second plurality of switch circuits comprising the second switch circuit and the third switch circuit, and wherein each switch circuit of the first plurality of switch circuits is coupled between the capacitor and a corresponding two or more switch circuits of the second plurality of switch circuits.

In one or more forty-ninth embodiments, further to the forty-eighth embodiment, for each switch circuit of the second plurality of switch circuits, the switch circuit is coupled between the first level and a different respective bus of the first bus, the second bus, and the one or more third buses.

In one or more fiftieth embodiments, further to the forty-ninth embodiment, a third level of the second HSN comprises a third plurality of switch circuits comprising the fourth switch circuit, wherein a fourth level of the second HSN comprises a fourth plurality of switch circuits comprising the fifth switch circuit and the sixth switch circuit, and wherein each switch circuit of the third plurality of switch circuits is coupled between the capacitor and a corresponding two or more switch circuits of the fourth plurality of switch circuits.

In one or more fifty-first embodiments, further to the fiftieth embodiment, for each switch circuit of the fourth plurality of switch circuits, the switch circuit is coupled between the third level and a different respective bus of the second bus, the fourth bus, and the one or more fifth buses.

In one or more fifty-second embodiments, further to the forty-fourth embodiment, based on the first one or more control signals, the first converter core provides a first sequence of a first plurality of modes of the first HSN, the first plurality of modes comprising the first mode, wherein the first HSN provides a first conductive path between the first bus and the second bus via the capacitor, and a second one or more modes each corresponding to a different respective bus of the one or more third buses, wherein for each mode of the second one or more modes, the mode provides a respective conductive path between the second bus and the corresponding bus of the one or more third buses via the capacitor.

In one or more fifty-third embodiments, further to the fifty-second embodiment, the multiple buses further comprises a fourth bus and one or more fifth buses, the multiple buses each coupled to the first converter core and to each of the one or more other converter cores, wherein the first HSN is coupled to a first terminal of the capacitor, wherein the first converter core further comprises a second HSN coupled to a second terminal of the capacitor, wherein the second HSN comprises a fourth switch circuit, a fifth switch circuit, and a sixth switch circuit, the method further comprises receiving a third voltage at the first converter via the fourth bus, receiving a second one or more control signals at the second HSN, wherein generating the second voltage is further based on the third voltage, and further comprises operating the second HSN with the first one or more control signals, wherein during a third mode of the second HSN, third charges are distributed with the capacitor and the one or more other converter cores via the fourth switch circuit, the fifth switch circuit, and a bus of the fourth bus and the fifth one or more buses, and during a fourth mode of the second HSN, fourth charges are distributed with the capacitor and the one or more other converter cores via the fourth switch circuit, the sixth switch circuit, and another bus of the fourth bus and the fifth one or more buses.

In one or more fifty-fourth embodiments, further to the fifty-third embodiment, based on the second one or more control signals, the first converter core provides a second sequence of a second plurality of modes of the second HSN, the second plurality of modes comprising a third mode wherein the second HSN provides a second conductive path between the second bus and the third bus via the capacitor, and one or more fourth modes each corresponding to a different respective bus of the one or more fifth buses, wherein for each mode of the one or more fourth modes, the mode provides a respective conductive path between the second bus and the corresponding bus of the one or more fifth buses via the capacitor.

In one or more fifty-fifth embodiments, further to the fifty-fourth embodiment, based on the first one or more control signals and the second one or more control signals, the first converter core provides a third sequence of a third plurality of modes of the first HSN and the second HSN, the third plurality of modes each corresponding to a different respective bus of the one or more fifth buses, wherein for each mode of the third plurality of modes, the mode provides a respective conductive path between the first bus and the corresponding bus of the one or more fifth buses via the capacitor.

In one or more fifty-sixth embodiments, further to the fifty-fifth embodiment, based on the first one or more control signals and the second one or more control signals, the first converter core provides a fourth sequence of a fourth plurality of modes of the first HSN and the second HSN, the fourth plurality of modes each corresponding to a different respective bus of the one or more third buses, wherein for each mode of the fourth plurality of modes, the mode provides a respective conductive path between the fourth bus and the corresponding bus of the one or more third buses via the capacitor.

Techniques and architectures for regulating a voltage are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A voltage converter comprising
   multiple buses comprising:
      a first bus to receive a first voltage;
      a second bus to provide a second voltage;
      one or more third buses;
   a first converter core comprising:
      a capacitor comprising a first terminal; and
      a first hierarchical switch network (HSN) coupled to the first terminal, the first HSN to receive a first one or more control signals, and, based on the first one or more control signals, to selectively provide any of first conductive paths each between the first terminal and a different respective bus of the multiple buses; and
   a second converter core coupled to the first converter core via each of the first bus, the second bus, and the one or more third buses;
   wherein the voltage converter is to generate the second voltage based on the first voltage, comprising the first converter core and the second converter core to distribute charges with the one or more third buses, wherein the first HSN includes a plurality of first-level switches that are each coupled to two or more second-level switches.

2. The voltage converter of claim 1, wherein the first HSN comprises:
a first level comprising first switch circuits; and
a second level comprising second switch circuits and third switch circuits;
wherein one of the first switch circuits is coupled between the capacitor and each of the second switch circuits; and
wherein another of the first switch circuits is coupled between the capacitor and each of the third switch circuits.

3. The voltage converter of claim 2, wherein for each of the second switch circuits and the third switch circuits, the switch circuit is coupled to one of the first bus, the second bus, or a respective one of the one or more third buses.

4. The voltage converter of claim 1, wherein the multiple buses further comprise:
a fourth bus coupled to each of the first converter core and the second converter core, the fourth bus to receive a third voltage; and
one or more fifth buses coupled to each of the first converter core and the second converter core;
wherein the capacitor further comprises a second terminal;
wherein the first converter core further comprises a second HSN coupled to the second terminal, the second HSN to receive a second one or more control signals and, based on the second one or more control signals, to selectively provide any of second conductive paths each between the second terminal and a different respective bus of the multiple buses; and
wherein the voltage converter is to generate the second voltage further based on the third voltage, comprising the first converter core and the second converter core to further distribute the charges with the one or more fifth buses.

5. The voltage converter of claim 1, further comprising first circuitry to generate the first one or more control signals, wherein, based on the first one or more control signals, the first converter core is to provide a first sequence of a first plurality of modes of the first HSN, the first plurality of modes comprising:
a first mode wherein the first HSN is to provide a first conductive path between the first bus and the second bus via the capacitor; and
one or more second modes each corresponding to a different respective bus of the one or more third buses, wherein for each mode of the one or more second modes, the mode provides a respective conductive path between the second bus and the corresponding bus of the one or more third buses via the capacitor.

6. The voltage converter of claim 5, wherein the multiple buses further comprise:
a fourth bus coupled to each of the first converter core and the second converter core, the fourth bus to receive a third voltage; and
one or more fifth buses coupled to each of the first converter core and the second converter core;
wherein the capacitor further comprises a second terminal;
wherein the first converter core further comprises a second HSN coupled to the second terminal, the second HSN to receive a second one or more control signals and, based on the second one or more control signals, to selectively provide any of second conductive paths each between the second terminal and a different respective bus of the multiple buses; and
wherein the voltage converter is to generate the second voltage further based on the third voltage, comprising the first converter core and the second converter core to further distribute the charge with the one or more fifth buses.

7. The voltage converter of claim 6, the first circuitry further to generate the second one or more control signals, wherein, based on the second one or more control signals, the first converter core is to provide a second sequence of a second plurality of modes of the second HSN, the second plurality of modes comprising:
a third mode wherein the second HSN is to provide a second conductive path between the second bus and the third bus via the capacitor; and
one or more fourth modes each corresponding to a different respective bus of the one or more fifth buses, wherein for each mode of the one or more fourth modes, the mode provides a respective conductive path between the second bus and the corresponding bus of the one or more fifth buses via the capacitor.

8. The voltage converter of claim 7, wherein, based on the first one or more control signals and the second one or more control signals, the first converter core is to provide a third sequence of a third plurality of modes of the first HSN and the second HSN, the third plurality of modes each corresponding to a different respective bus of the one or more fifth buses, wherein for each mode of the third plurality of modes, the mode provides a respective conductive path between the first bus and the corresponding bus of the one or more fifth buses via the capacitor.

9. The voltage converter of claim 8, wherein, based on the first one or more control signals and the second one or more control signals, the first converter core is to provide a fourth sequence of a fourth plurality of modes of the first HSN and the second HSN, the fourth plurality of modes each corresponding to a different respective bus of the one or more third buses, wherein for each mode of the fourth plurality of modes, the mode provides a respective conductive path between the fourth bus and the corresponding bus of the one or more third buses via the capacitor.

10. The voltage converter of claim 1, wherein the second converter core comprises:
a second capacitor comprising a second terminal; and
a second HSN coupled to the second terminal, the second HSN to receive a second one or more control signals, and, based on the second one or more control signals, to selectively provide any of second conductive paths each between the second terminal and a different respective bus of the multiple buses.

11. An integrated circuit (IC) comprising:
multiple buses comprising:
a first bus to receive a first voltage;
a second bus to provide a second voltage;
one or more third buses;
converter cores each coupled to the multiple buses, the converter cores each comprising a respective capacitor, and a respective first hierarchical switch network (HSN) coupled to a first terminal of the respective capacitor;
first circuitry coupled to provide control signals each to a respective one of the converter cores;
wherein for each of the converter cores, the respective first HSN is to selectively provide, based on the control signals, any of respective first conductive paths each between the first terminal of the respective capacitor and a different respective bus of the multiple buses; and
wherein the converter cores are to generate the second voltage based on the first voltage, comprising the converter cores to distribute charges with the one or more third buses, wherein the first HSN includes a plurality of first-level switches that are each coupled to two or more second-level switches.

12. The IC of claim 11, wherein the multiple buses further comprise:
a fourth bus coupled to each of the converter cores, the fourth bus to receive a third voltage; and
one or more fifth buses coupled to each of the converter cores;
wherein, for each of the converter cores:
the core further comprises a respective second HSN coupled to a second terminal of the respective capacitor; and
the respective second HSN is to selectively provide, based on the control signals, any of respective second conductive paths each between the second terminal of the respective capacitors and a different respective bus of the multiple buses; and
wherein the converter cores are to generate the second voltage further based on the third voltage, comprising the converter cores to further distribute the charges with the one or more fifth buses.

13. The IC of claim 11, wherein the converter cores comprises a first converter core, wherein the respective first HSN of the first converter core comprises:
a first level comprising first switch circuits; and
a second level comprising second switch circuits and third switch circuits;
wherein one of the first switch circuits is coupled between the respective capacitor and each of the second switch circuits; and
wherein another of the first switch circuits is coupled between the capacitor and each of the third switch circuits.

14. The IC of claim 13, wherein for each of the second switch circuits and the third switch circuits, the switch circuit is coupled to one of the first bus, the second bus, or a respective one of the one or more third buses.

15. The IC of claim 11, wherein the converter cores comprises a first converter core, and wherein, based on the control signals, the first converter core is to provide a first sequence of a first plurality of modes of the respective first HSN, the first plurality of modes comprising:
a first mode wherein the respective first HSN is to provide a first conductive path between the first bus and the second bus via the respective capacitor; and
one or more second modes each corresponding to a different respective bus of the one or more third buses, wherein for each mode of the one or more second modes, the mode provides a respective conductive path between the second bus and the corresponding bus of the one or more third buses via the respective capacitor.

16. The IC of claim 15, wherein the respective first HSN comprises:
a first level comprising first switch circuits; and
a second level comprising second switch circuits and third switch circuits;
wherein one of the first switch circuits is coupled between the respective capacitor and each of the second switch circuits;
wherein another of the first switch circuits is coupled between the respective capacitor and each of the third switch circuits; and
wherein the first converter core to provide the first sequence comprises the respective first HSN is to activate the one of the first switch circuits and, while the first switch circuit is activated, to successively activate the second switch circuits.

17. A system comprising:
an integrated circuit comprising:
multiple buses comprising:
a first bus to receive a first voltage;
a second bus to provide a second voltage;
one or more third buses;
converter cores each coupled to the multiple buses, the converter cores each comprising a respective capacitor, and a respective first hierarchical switch network (HSN) coupled to a first terminal of the respective capacitor;
first circuitry coupled to provide control signals each to a respective one of the converter cores;
wherein for each of the converter cores, the respective first HSN is to selectively provide, based on the control signals, any of respective first conductive paths each between the first terminal of the respective capacitor and a different respective bus of the multiple buses; and
wherein the converter cores are to generate the second voltage based on the first voltage, comprising the converter cores to distribute charges with the one or more third buses, wherein the first HSN includes a plurality of first-level switches that are each coupled to two or more second-level switches;
a processor core and a memory to execute an operating system, the processor core coupled to receive power from the integrated circuit based on the second voltage; and
a display device coupled to the processor, the display device to display an image based on a signal communicated with the processor.

18. The system of claim 17, wherein the multiple buses further comprise:
a fourth bus coupled to each of the converter cores, the fourth bus to receive a third voltage; and
one or more fifth buses coupled to each of the converter cores;
wherein, for each of the converter cores:
the core further comprises a respective second HSN coupled to a second terminal of the respective capacitor; and
the respective second HSN is to selectively provide, based on the control signals, any of respective second conductive paths each between the second terminal of the respective capacitors and a different respective bus of the multiple buses; and
wherein the converter cores are to generate the second voltage further based on the third voltage, comprising the converter cores to further distribute the charges with the one or more fifth buses.

19. The system of claim 17, wherein the converter cores comprises a first converter core, wherein the respective first HSN of the first converter core comprises:
a first level comprising first switch circuits; and
a second level comprising second switch circuits and third switch circuits;
wherein one of the first switch circuits is coupled between the respective capacitor and each of the second switch circuits; and
wherein another of the first switch circuits is coupled between the capacitor and each of the third switch circuits.

20. The system of claim 19, wherein for each of the second switch circuits and the third switch circuits, the switch circuit is coupled to one of the first bus, the second bus, or a respective one of the one or more third buses.

* * * * *